US012187503B2

(12) United States Patent
Tye et al.

(10) Patent No.: US 12,187,503 B2
(45) Date of Patent: Jan. 7, 2025

(54) CONTAINER WITH LINER

(71) Applicant: Graphic Packaging International, LLC, Atlanta, GA (US)

(72) Inventors: Paul Tye, Buckinghamshire (GB); Elliot Hithersay, Derbyshire (GB)

(73) Assignee: Graphic Packaging International, LLC, Atlanta, GA (US)

( * ) Notice: Subject to any disclaimer, the term of this patent is extended or adjusted under 35 U.S.C. 154(b) by 245 days.

(21) Appl. No.: 17/867,856

(22) Filed: Jul. 19, 2022

(65) Prior Publication Data

US 2022/0348376 A1 Nov. 3, 2022

Related U.S. Application Data

(62) Division of application No. 16/532,819, filed on Aug. 6, 2019, now Pat. No. 11,434,038.

(Continued)

(51) Int. Cl.

| | |
|---|---|
| ***B65D 5/00*** | (2006.01) |
| ***B31B 50/585*** | (2017.01) |
| ***B31B 50/73*** | (2017.01) |
| ***B65D 5/20*** | (2006.01) |
| ***B65D 5/42*** | (2006.01) |
| ***B65D 5/56*** | (2006.01) |
| ***B65D 81/34*** | (2006.01) |

(Continued)

(52) U.S. Cl.

CPC .......... *B65D 5/0015* (2013.01); *B31B 50/585* (2017.08); *B31B 50/732* (2017.08); *B65D 5/20* (2013.01); *B65D 5/2038* (2013.01); *B65D 5/4266* (2013.01); *B65D 5/56* (2013.01); *B65D 81/3453* (2013.01); *B31B 2100/002* (2017.08); *B31B 2120/404* (2017.08); *B65D 2581/3472* (2013.01); *B65D 2581/3479* (2013.01); *B65D 2581/3489* (2013.01)

(58) Field of Classification Search

CPC ................ B31B 50/585; B31B 50/732; B31B 2120/404; B31B 2100/002; B31B 50/592; B31B 50/26

USPC .......................................................... 493/418

See application file for complete search history.

(56) References Cited

U.S. PATENT DOCUMENTS

| | | | |
|---|---|---|---|
| 2,110,681 | A | 3/1938 | Rutledge |
| 2,663,449 | A | 12/1953 | Delle |

(Continued)

FOREIGN PATENT DOCUMENTS

| | | | |
|---|---|---|---|
| CA | 2 814 149 | A1 | 4/2012 |
| CN | 203450620 | U | 2/2014 |

(Continued)

OTHER PUBLICATIONS

Notice of Reasons for Refusal for Japanese Application No. 2021-506419 dated Apr. 4, 2023 with translation.

(Continued)

*Primary Examiner* — Jacob A Smith
(74) *Attorney, Agent, or Firm* — Womble Bond Dickinson (US) LLP

(57) ABSTRACT

A container for holding a food product. The container can comprise a base layer and a liner at least partially attached to an inner surface of the base layer, a flange comprising a central panel of the base layer, an opening extending in the central panel, and a sidewall comprising at least a panel foldably connected to the central panel along the opening.

18 Claims, 17 Drawing Sheets

Related U.S. Application Data

(60) Provisional application No. 62/851,932, filed on May 23, 2019, provisional application No. 62/796,716, filed on Jan. 25, 2019, provisional application No. 62/715,520, filed on Aug. 7, 2018.

(51) Int. Cl.
*B31B 100/00* (2017.01)
*B31B 120/40* (2017.01)

(56) References Cited

U.S. PATENT DOCUMENTS

| | | | | |
|---|---|---|---|---|
| 3,104,012 | A | 9/1963 | Beamish | |
| 3,154,215 | A | 10/1964 | Le Vesconte | |
| 3,358,900 | A | 12/1967 | Perdue et al. | |
| 3,489,331 | A | 1/1970 | Andersson et al. | |
| D219,263 | S | 11/1970 | Castelli | |
| 3,575,338 | A | 4/1971 | Dilot | |
| 3,640,188 | A | 2/1972 | Dilot | |
| D224,662 | S | 8/1972 | Swett | |
| D232,302 | S | 8/1974 | Lazure | |
| 3,863,832 | A | 2/1975 | Gordon | |
| 3,893,882 | A | 7/1975 | Repenning | |
| 3,941,301 | A | 3/1976 | Jorgensen | |
| 4,046,310 | A | 9/1977 | Gustafsson | |
| 4,057,380 | A | 11/1977 | Hosoe | |
| 4,081,125 | A | 3/1978 | Meyers | |
| 4,130,236 | A | 12/1978 | Manizza | |
| D251,951 | S | 5/1979 | Florian | |
| 4,177,715 | A | 12/1979 | Meyers | |
| 4,202,465 | A | 5/1980 | McLaren | |
| D257,109 | S | 9/1980 | Conti | |
| 4,241,863 | A | 12/1980 | Faller | |
| 4,279,354 | A | 7/1981 | Conti | |
| 4,283,427 | A | 8/1981 | Winters et al. | |
| 4,305,542 | A | 12/1981 | Benzschawel et al. | |
| 4,308,985 | A | 1/1982 | Manizza | |
| 4,325,905 | A | 4/1982 | Takahashi | |
| 4,351,473 | A | 9/1982 | Manizza | |
| 4,533,065 | A | 8/1985 | Chazal et al. | |
| 4,555,381 | A * | 11/1985 | Chazal | B29C 51/165 264/516 |
| 4,574,174 | A | 3/1986 | McGonigle | |
| D284,727 | S | 7/1986 | Gerber | |
| 4,718,596 | A | 1/1988 | Muller et al. | |
| D302,068 | S | 7/1989 | Forbes, Jr. | |
| 4,848,648 | A | 7/1989 | Eisman | |
| 4,903,842 | A | 2/1990 | Tokuda | |
| 4,943,456 | A | 7/1990 | Pollart et al. | |
| 4,944,451 | A | 7/1990 | Forbes, Jr. | |
| 5,000,374 | A | 3/1991 | Deiger | |
| 5,002,826 | A | 3/1991 | Pollart et al. | |
| 5,002,833 | A | 3/1991 | Kinsey, Jr. et al. | |
| 5,009,939 | A | 4/1991 | Goldberg | |
| 5,118,747 | A | 6/1992 | Pollart et al. | |
| D332,393 | S | 1/1993 | Boone | |
| 5,203,491 | A | 4/1993 | Marx et al. | |
| 5,253,801 | A | 10/1993 | Bernstein et al. | |
| 5,326,021 | A | 7/1994 | Farrell | |
| 5,351,879 | A | 10/1994 | Liu | |
| 5,356,070 | A | 10/1994 | Rigby | |
| 5,410,135 | A | 4/1995 | Pollart et al. | |
| 5,412,187 | A | 5/1995 | Walters et al. | |
| D363,192 | S | 10/1995 | Reeves | |
| D367,172 | S | 2/1996 | Brightbill | |
| 5,530,231 | A | 6/1996 | Walters et al. | |
| D372,170 | S | 7/1996 | Ahern, Jr. | |
| 5,533,622 | A | 7/1996 | Stockley, III | |
| 5,533,623 | A | 7/1996 | Fischer | |
| 5,538,179 | A | 7/1996 | Cai | |
| 5,588,583 | A | 12/1996 | Cargile, Jr. | |
| 5,647,168 | A | 7/1997 | Gilbert | |
| D420,855 | S | 2/2000 | Hurley | |
| 6,092,687 | A | 7/2000 | Hupp et al. | |
| 6,116,501 | A | 9/2000 | Hupp | |
| 6,204,492 | B1 | 3/2001 | Zeng et al. | |
| 6,234,386 | B1 | 5/2001 | Drummond et al. | |
| D448,130 | S | 9/2001 | Wagner | |
| 6,433,322 | B2 | 8/2002 | Zeng et al. | |
| 6,552,315 | B2 | 4/2003 | Zeng et al. | |
| D484,364 | S | 12/2003 | Bailey | |
| 6,677,563 | B2 | 1/2004 | Lai | |
| D549,457 | S | 8/2007 | Dretzka | |
| D595,155 | S | 6/2009 | Larson | |
| D633,341 | S | 3/2011 | Smyers | |
| D643,311 | S | 8/2011 | Meyers | |
| D656,789 | S | 4/2012 | Locke | |
| D658,933 | S | 5/2012 | Woodard | |
| D688,572 | S | 8/2013 | Marin | |
| D688,921 | S | 9/2013 | Miras | |
| 8,534,460 | B2 | 9/2013 | Wnek et al. | |
| D693,180 | S | 11/2013 | Peterson | |
| 8,801,995 | B2 | 8/2014 | Wnek et al. | |
| D712,153 | S | 9/2014 | Lee | |
| D713,741 | S | 9/2014 | Wilmers | |
| 9,783,345 | B2 | 10/2017 | Bentham | |
| D897,847 | S | 10/2020 | Glassman | |
| D962,008 | S | 8/2022 | Moore | |
| D970,977 | S | 11/2022 | Glupker | |
| 2005/0031814 | A1 | 2/2005 | Dawes | |
| 2007/0116806 | A1 | 5/2007 | Parsons | |
| 2008/0035634 | A1 | 2/2008 | Zeng et al. | |
| 2011/0174676 | A1 | 7/2011 | Stockhaus | |
| 2011/0259784 | A1 | 10/2011 | Tye et al. | |
| 2012/0248180 | A1 | 10/2012 | White et al. | |
| 2013/0327821 | A1 | 12/2013 | Zwaga et al. | |
| 2014/0124406 | A1 | 5/2014 | Ishikawa | |
| 2014/0183198 | A1 | 7/2014 | Slack | |
| 2014/0224866 | A1 | 8/2014 | Littlejohn et al. | |
| 2015/0225120 | A1 | 8/2015 | Wnek et al. | |
| 2015/0375889 | A1 | 12/2015 | Brockman | |
| 2017/0341355 | A1 | 11/2017 | Peiffer et al. | |
| 2018/0022529 | A1 | 1/2018 | Tye | |
| 2018/0319568 | A1 | 11/2018 | Tye | |
| 2020/0047940 | A1 | 2/2020 | Tye et al. | |
| 2020/0047975 | A1 | 2/2020 | Tye et al. | |
| 2020/0255200 | A1 | 8/2020 | Mondini et al. | |
| 2022/0055789 | A1 | 2/2022 | Mero | |
| 2022/0289459 | A1 | 9/2022 | Kastanek | |
| 2022/0348376 | A1 | 11/2022 | Tye | |

FOREIGN PATENT DOCUMENTS

| | | | | |
|---|---|---|---|---|
| DE | 100 22 552 | | 11/2001 | |
| EM | 009090848-0001 | | 8/2022 | |
| EM | 009090848-0002 | | 8/2022 | |
| EP | 0052021 | B1 | 1/1985 | |
| EP | 0 671 332 | A1 | 9/1995 | |
| EP | 1 104 744 | A2 | 6/2001 | |
| FR | 2 133 727 | | 12/1972 | |
| FR | 2406522 | | 5/1979 | |
| FR | 2826938 | | 1/2003 | |
| FR | 2933329 | | 1/2010 | |
| GB | 1 314 148 | | 4/1973 | |
| GB | 1 501 764 | | 2/1978 | |
| GB | 1 602 625 | | 11/1981 | |
| GB | 2 487 765 | A | 8/2012 | |
| GB | 2 550 386 | A | 11/2017 | |
| JP | H06-42636 | | 6/1994 | |
| JP | 2000-141511 | | 5/2000 | |
| JP | 2000141511 | A * | 5/2000 | B31B 50/80 |
| JP | 2000-190948 | A | 7/2000 | |
| JP | 2001-002056 | A | 1/2001 | |
| JP | 2001-233322 | A | 8/2001 | |
| JP | 2001-233324 | A | 8/2001 | |
| JP | 2001 278246 | A | 10/2001 | |
| JP | 2002 347746 | A | 12/2002 | |
| JP | 2006-298395 | A | 11/2006 | |
| KR | 10-1539187 | B1 | 7/2015 | |
| TW | M 295475 | U | 8/2006 | |
| TW | M 301016 | U | 11/2006 | |
| WO | WO 2003/041945 | | 5/2003 | |
| WO | WO 2007/127371 | | 11/2007 | |

(56) References Cited

FOREIGN PATENT DOCUMENTS

| | | | |
|---|---|---|---|
| WO | WO 2009/138786 | | 11/2009 |
| WO | WO 2012/049005 | | 4/2012 |
| WO | WO 2013/002639 | | 1/2013 |
| WO | WO 2014/032059 | A1 | 2/2014 |
| WO | WO 2014/066867 | A1 | 5/2014 |
| WO | WO 2015/009518 | | 1/2015 |
| WO | WO 2019/094057 | A1 | 5/2016 |
| WO | WO 2018/017783 | | 1/2018 |
| WO | WO 2018/017783 | A1 | 1/2018 |
| WO | WO 2018/178508 | A1 | 10/2018 |
| WO | WO 2019/020863 | | 1/2019 |
| WO | WO 2019/092323 | A1 | 5/2019 |
| WO | WO 2020/033350 | | 2/2020 |
| WO | WO 2020/033352 | | 2/2020 |
| WO | WO 2021/209610 | A1 | 10/2021 |

OTHER PUBLICATIONS

PaperSeal Original Tray, available Apr. 28, 2023, [online], [site visited Apr. 28, 2023]. Available from internet, URL: https://www.graphicpkg.com/products/paperseal-original/ (Year: 2023).

Compartment K&K Paper Tray 2100ml, available Apr. 28, 2023, [online], [site visited Apr. 28, 2023]. Available from internet, URL: https://goodwillretail.co.th/ehop/2-compartment-kk-paper-tray-2100ml/ (Year: 2023).

Examination Report No. 1 for standard patent application for Australian Patent Application No. 2019261737 dated Dec. 17, 2019.

International Search Report and Written Opinion for PCT/US2019/045217 dated Nov. 22, 2019.

International Search Report and Written Opinion for PCT/US2019/045215 dated Nov. 26, 2019.

Supplementary European Search Report for EP 19 75 6086 dated Nov. 20, 2020.

Supplementary European Search Report for EP 19 75 6085 dated Mar. 30, 2021.

Communication Pursuant to Rule 114(2) EPC dated Oct. 20, 2021, for EP 19756086.5.

Office Action for Chinese Application No. 201980052309.6 dated Mar. 2, 2022.

Communication Pursuant to Rule 114(2) EPC for European Application No. 19756085.7 dated Apr. 5, 2022.

Issue Notification for U.S. Appl. No. 16/532,819 dated Aug. 17, 2022.

Issue Fee Transmittal Form for U.S. Appl. No. 16/532,819 dated Jul. 27, 2022.

Corrected Notice of Allowability for U.S. Appl. No. 16/532,819 dated Jun. 9, 2022.

Notice of Allowance and Fee(s) Due for U.S. Appl. No. 16/532,819 dated May 17, 2022.

Amendment A and Response to Office Action for U.S. Appl. No. 16/532,819 dated Feb. 11, 2022.

Office Action for U.S. Appl. No. 16/532,819 dated Dec. 3, 2021.

Response to Restriction Requirement for U.S. Appl. No. 16/532,819 dated Nov. 1, 2021.

Office Action for U.S. Appl. No. 16/532,819 dated Oct. 1, 2021.

International Search Report and Written Opinion for PCT/US2023/020307 dated Aug. 21, 2023.

* cited by examiner

CONTAINER WITH LINER

CROSS-REFERENCE TO RELATED APPLICATIONS

This application is a divisional application of U.S. patent application Ser. No. 16/532,819, filed on Aug. 6, 2019, which claims the benefit of U.S. Provisional Patent Application No. 62/851,932, filed on May 23, 2019, U.S. Provisional Patent Application No. 62/796,716, filed on Jan. 25, 2019, and U.S. Provisional Patent Application No. 62/715,520, filed on Aug. 7, 2018.

INCORPORATION BY REFERENCE

The disclosures of U.S. patent application Ser. No. 16/532,819, filed Aug. 6, 2019, U.S. Provisional Patent Application No. 62/851,932, filed May 23, 2019, U.S. Provisional Patent Application No. 62/796,716, filed Jan. 25, 2019, U.S. Provisional Patent Application No. 62/715,520, filed Aug. 7, 2018, U.S. patent application Ser. No. 16/037,425, filed Jul. 17, 2018, U.S. Provisional Patent Application No. 62/649,159, filed Mar. 28, 2018, U.S. Provisional Patent Application No. 62/643,914, filed Mar. 16, 2018, U.S. patent application Ser. No. 15/654,814, filed Jul. 20, 2017, U.S. Provisional Patent Application No. 62/365,635, filed Jul. 22, 2016, and U.S. patent application Ser. No. 12/992,131, filed Feb. 11, 2011, PCT Patent Application No. PCT/GB/09/50506, filed May 13, 2009, are hereby incorporated by reference for all purposes as if presented herein in their entirety.

BACKGROUND OF THE DISCLOSURE

The present disclosure relates to blanks, containers, trays, constructs, and various features and methods for forming a container from a blank. More specifically, the disclosure is generally directed to a container having a liner, the container being suitable for heating a food product.

SUMMARY OF THE DISCLOSURE

In general, one aspect of the disclosure is generally directed to a container for holding a food product. The container can comprise a base layer and a liner at least partially attached to an inner surface of the base layer, a flange comprising a central panel of the base layer, an opening extending in the central panel, and a sidewall comprising at least a panel foldably connected to the central panel along the opening.

In another aspect, the disclosure is generally directed to, in combination, a blank and a liner material for forming a container for holding a food product. The blank can comprise a central panel for at least partially forming a flange of the container formed from the blank and the liner material, an opening extending in the central panel, and a panel foldably connected to the central panel along the opening. The panel can be for at least partially forming a sidewall of the container formed from the blank and the liner material. The blank can be for forming a base layer of the container, and the liner material can be for being at least partially attached to an inner surface of the base layer when the container is formed from the blank and the liner material.

In another aspect, the disclosure is generally directed to a method of forming a container for holding a food product. The method can comprise obtaining a flat construct, the flat construct comprising a central panel, an opening extending in the central panel, and a panel foldably connected to the central panel along the opening. The method further can comprise forming a base layer of the container by folding the panel to extend at least downwardly from the central panel so that the panel at least partially forms a sidewall and the central panel at least partially forms a flange and attaching a liner to an inner surface of the base layer.

In another aspect, the disclosure is generally directed to a method of forming a container for holding a food product. The method can comprise obtaining a flat construct and applying air pressure to a heated liner material and the construct to move the liner material toward the construct. The air pressure can cause the construct to form a base layer having an interior. The method further can comprise moving the liner material into the interior of the base layer to adhere the liner material to the base layer.

In another aspect, the disclosure is generally directed to a container for holding a food product. The container can comprise a flange comprising a central panel. An opening can extend in the central panel. The container further can comprise a sidewall comprising at least a panel foldably connected to the central panel and a denesting feature extending outwardly from the sidewall. The denesting feature can be for engaging a nested container positioned below the container in a stacked arrangement and for forming a denesting gap between the flange and the nested container.

In another aspect, the disclosure is generally directed to a stacked arrangement of containers for holding a food product. The stacked arrangement can comprise at least a first container and a second container and each container in the stacked arrangement of containers can comprise a flange comprising a central panel. An opening can extend in the central panel. Each container further can comprise a sidewall comprising at least a panel foldably connected to the central panel and a denesting feature extending outwardly from the sidewall. The denesting feature of the first container can engage the second container to at least partially form a denesting gap between the second container and the flange of the first container.

In another aspect, the disclosure is generally directed to a blank for forming a container for holding a food product. The blank can comprise a central panel for at least partially forming a flange of the container formed from the blank, an opening extending in the central panel, and a panel foldably connected to the central panel. The panel can be for at least partially forming a sidewall of the container formed from the blank. The blank further can comprise a denesting feature extending from the panel for extending outwardly from the sidewall when the container is formed from the blank. The denesting feature can be for engaging a nested container positioned below the container in a stacked arrangement and for forming a denesting gap between the flange and the nested container when the container is formed from the blank.

In another aspect, the disclosure is generally directed to a method of forming a container for holding a food product. The method can comprise obtaining a blank comprising a central panel, an opening extending in the central panel, a panel foldably connected to the central panel, and a denesting feature extending from the panel. The method further can comprise forming the container from at least the blank. The forming the container can comprise folding the panel to extend at least downwardly from the central panel so that the central panel at least partially forms a flange of the container and the panel at least partially forms a sidewall of the container. The denesting feature can extend outwardly from the sidewall. The method also can comprise positioning the container relative to a nested container so that the denesting feature engages the nested container and forms a denesting gap between the nested container and the flange of the container.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure relates generally to various aspects of containers, constructs, trays, materials, packages, elements, and articles, and methods of making such containers, constructs, trays, materials, packages, elements, and articles. Although several different aspects, implementations, and embodiments are disclosed, numerous interrelationships between, combinations thereof, and modifications of the various aspects, implementations, and embodiments are contemplated hereby. In one illustrated embodiment, the present disclosure relates to forming a container or tray for holding food items or various other articles. However, in other embodiments, the container or tray can be used to form other non-food containing articles or may be used for heating or cooking.

Figure 1:
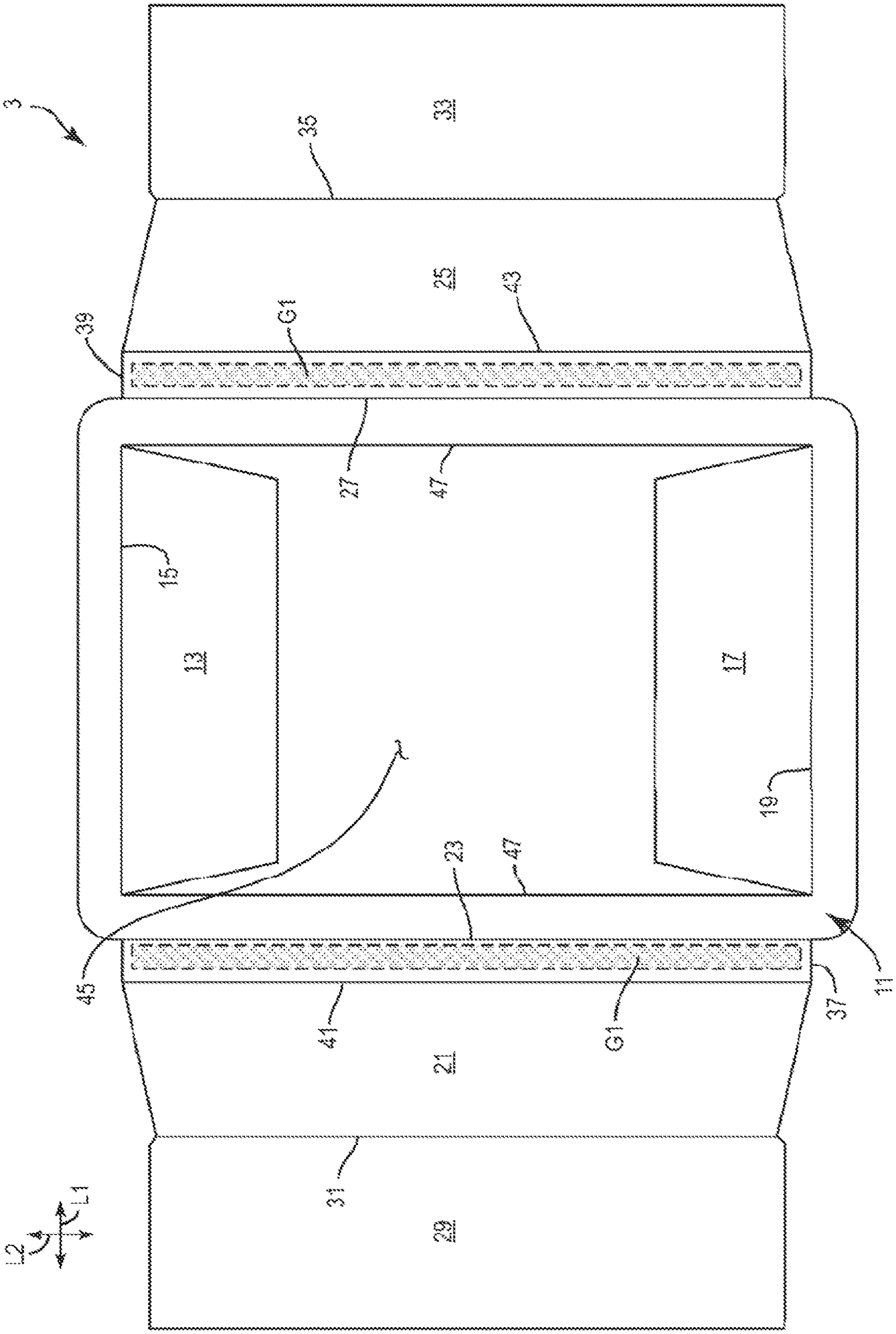
FIG. 1 is a plan view of a blank used for forming a container according to a first exemplary embodiment of the disclosure.

FIG. 1 illustrates a blank 3 that is used to form a base layer 7 of a container 5 (FIG. 4), wherein the container 5 includes a liner 9 attached to the base layer 7 (FIG. 4) according to a first embodiment of the disclosure. In one embodiment, the base layer comprises paperboard (e.g., solid bleached sulphate folding boxboard), or other suitable material that can be recyclable and/or suitable for use in an oven (not shown), and the liner 9 comprises a plastic layer such as polyethylene, a polyethylene terephthalate (PET) material, or any other thermoplastic material, or a bioplastic, such as vegetable oil or starch based plastics. In an exemplary embodiment, the liner 9 comprises polyethylene that can be softened and fused to the base layer 7. In an alternative embodiment, the liner 9 can comprise PET or a similar material that is at least partially attached to the base layer 7 by a heat seal layer (e.g., a thermoformable sealant grade transparent polyester packaging film, such as Mylar® XMPOL12 available from DuPont Teijin Films U.S. Limited Partnership of Hopewell, Va., or any suitable thermoformable sealant or adhesive, any suitable heat or pressure activated adhesive, or any other suitable material), wherein a PET liner can be more suitable for uses that require heating of the container in an oven. In the illustrated embodiment, the liner 9 is at least partially attached to the base layer 7 and is in contact with the food product held in the container 5 (e.g., during heating). In one embodiment, after heating the food product, the base layer 7 and the liner 9 can be separated to allow both the base layer 7 and the liner 9 to be recycled separately.

The blank 3 can be formed from a single ply of material, such as but not limited to paperboard, cardboard, paper, a polymeric sheet, and/or a laminate that includes more than one layer. In one embodiment, the blank 3 can include a microwave interactive layer (not shown) such as is common in MicroRite® containers available from Graphic Packaging International of Atlanta, GA. The microwave interactive layer can be commonly referred to as, or can have as one of its components, a susceptor, a foil, a microwave shield, or any other term or component that refers to a layer of material suitable for shielding microwave energy and/or causing heating in a microwave oven.

As shown in FIG. 1, the blank 3 has a longitudinal direction L1 and a lateral direction L2. In the illustrated embodiment, the blank 3 has a central panel 11, a first end panel 13 foldably connected to the central panel 11 at a longitudinal fold line 15, a second end panel 17 foldably connected to the central panel 11 at a longitudinal fold line 19, a first side panel 21 foldably connected to the central panel 11 at a lateral fold line 23, and a second side panel 25 foldably connected to the central panel 11 at a lateral fold line 27. In the illustrated embodiment, the blank 3 further comprises a first bottom panel 29 foldably connected to the first side panel 21 along a lateral fold line 31 and a second bottom panel 33 foldably connected to the second side panel 25 along a lateral fold line 35.

As shown in FIG. 1, the side panels 21, 25 include respective attachment portions 37, 39 at least partially defined by respective fold lines 41, 43 in the respective side panels 21, 25. In the illustrated embodiment, the end panels 13, 17 are foldably connected to the central panel 11 adjacent and/or along a central cutout or opening 45 so that edges of the central panel 11 and the end panels 13, 17 extend along the cutout 45 in the blank 3. In one embodiment, the central panel 11 includes two edges 47 extending in the lateral direction L2 from the respective ends of the longitudinal fold line 15 to respective edges of the longitudinal fold line 19. As shown in FIG. 1, the side panels 21, 25 are foldably connected to the central panel 11 along fold lines 23, 27 that are spaced apart from the cutout 45 and the edges 47. The blank 3 could be otherwise shaped, arranged, and/or configured without departing from the disclosure. In addition, any of the central panel 11, the end panels 13, 17, the side panels 21, 25, and/or the bottom panels 29, 33 could be omitted or could be otherwise shaped, arranged, positioned, and/or configured without departing from the disclosure. For example, the blank 3 could have any suitable number of panels and any suitable shape.

Figure 2:
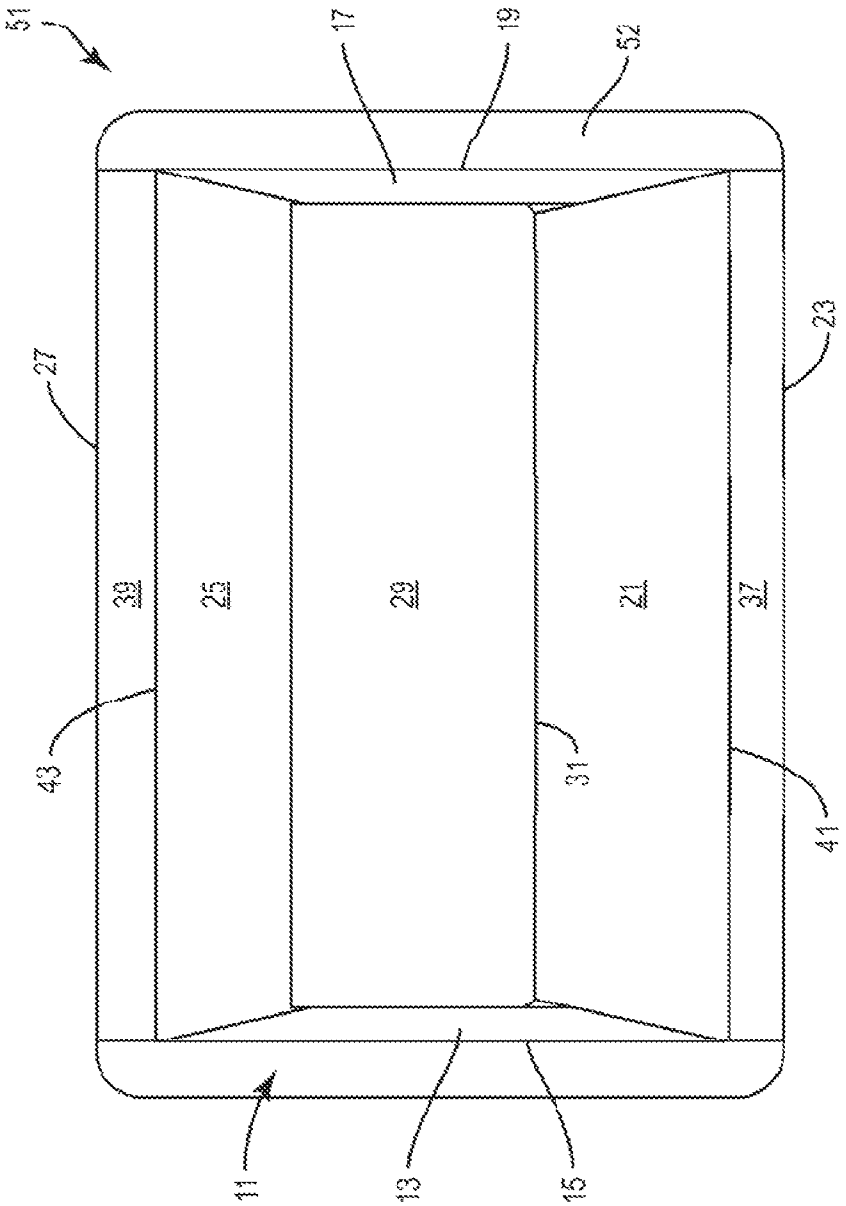
FIGS. 2 and 3 are plan views of a flat construct formed from the blank of FIG. 1 according to the first exemplary embodiment of the disclosure.
Figure 3:
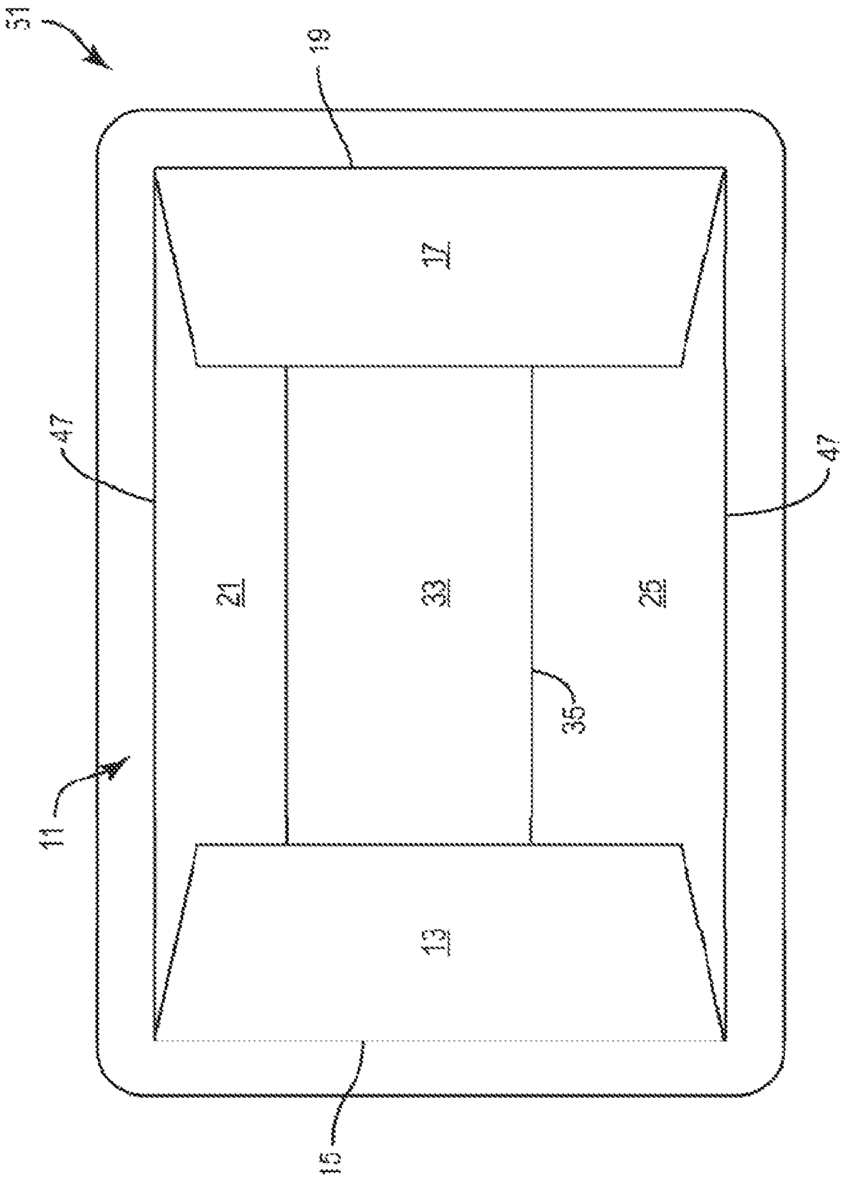

As shown in FIGS. 2 and 3, the blank 3 can be formed into a flat construct 51 (e.g., a folded and glued blank), which is prepared to be formed into the base portion 7 of the container 5 as described in more detail below. The construct 51 can be formed by applying adhesive (e.g., in the form of glue strips G1 as shown in phantom in FIG. 1) to the attachment portions 37, 39 of the side panels 21, 25 and/or to the central panel 11 and folding the side panels 21, 25 along the respective fold lines 23, 27 over the central panel 11. The attachment portions 37, 39 can be folded into face-to-face contact with an undersurface 52 of the central panel 11 so that the glue strips G1 adhere the attachment portions 37, 39 to the central panel 11 (FIG. 2). In the illustrated embodiment, the attachment portions 37, 39 extend from the respective fold lines 23, 27 to the respective edges 47 of the central panel 11. As shown in FIGS. 2 and 3, the side panels 21, 25 can at least partially overlap the end panels 13, 17 and the cutout 45. Additionally, the bottom panels 29, 33 can at least partially overlap one another in the construct 51. The construct 51 could be otherwise formed without departing from the disclosure.

Figure 4:
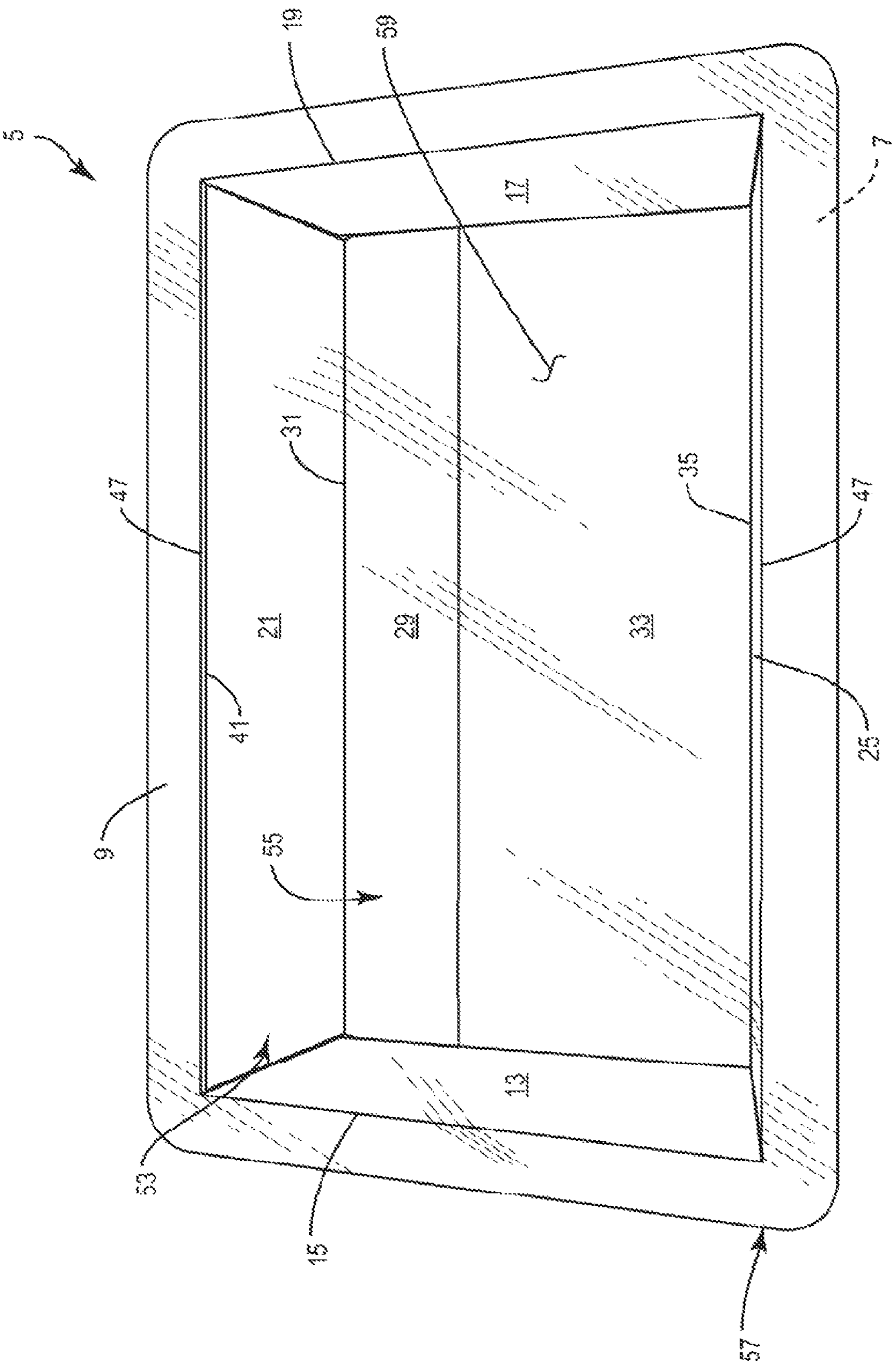
FIG. 4 is a perspective view of the container formed from the construct of FIGS. 2 and 3 and a liner according to the first exemplary embodiment of the disclosure.

As shown in FIGS. 2 and 3, the construct 51 can lie substantially flat for compact storage and/or transportation while being prepared to form the container 5. In the illustrated embodiment, the container 5 can be formed from the flat construct 51 by folding the end panel 13, 17 downwardly relative to the central panel 11 along the respective fold lines 15, 19 and folding side portions the side panels 21, 25 downwardly relative to the central panel 11 and the attachment portions 37, 39 along the respective fold lines 41, 43. As shown in FIG. 4, the end panels 13, 17 and the side portions of the side panels 21, 25 extend generally downwardly from the central panel 11 to at least partially form a sidewall 53 extending around a perimeter of a bottom wall 55 formed from the partially overlapped bottom panels 29, 33. In the illustrated embodiment, the central panel 11 and the attachment portions 37, 39 can form a flange 57 of the container 5. The sidewall 53, the bottom wall 55, and/or the flange 57 could be omitted or could be otherwise shaped, arranged, positioned, and/or configured without departing from the disclosure. Also, the container 5 can have one or more injection-molded features that can reinforce the flange 57 and/or other portions of the container without departing from the disclosure.

As shown in FIG. 4, the container 5 further includes the liner 9 attached to the inner surface of the base layer 7 formed from the blank 3. In one embodiment, the liner 9 (e.g., for a polyethylene liner) can be attached to the base layer 7 (e.g., by heating the liner and fusing it to the base layer). Alternatively, the liner 9 can be attached to the base layer 7 by a heat seal layer (e.g., for a PET liner). The liner 9 can extend over the sidewall 53, the bottom wall 55, and the flange 57. In one embodiment, the liner 9 can extend beyond the flange 57, the edges of the liner 9 and the flange 57 can be aligned, and/or the liner can be spaced inwardly from the edge of the flange 57. In the illustrated embodiment, the liner 9 can be attached to at least a portion of each of the bottom panels 29, 33, the end panels 13, 17, the side panels 21, 25, and the central panel 11. In one embodiment, the liner 9 can at least partially retain the base layer 7 in the shape of the sidewall 53 and the container 5 in general (e.g., can help prevent the end panels 13, 17, the side panels 21, 25, and/or the bottom panels 29, 33 from separating from one another). The container 5, including the liner 9 and/or the base layer 7, could be otherwise shaped, arranged, positioned, and/or configured without departing from the disclosure.

In one embodiment, the construct 51 can be considered a self-erecting construct, wherein heat and pressure used to apply the liner 9 to the construct can cause the flat construct 51 (FIGS. 2 and 3) to be erected into the base layer 7 of the container 5 (FIG. 4). For example, the end panels 13, 17 and the side portions of the side panels 21, 25 can fold downwardly with respect to the central panel 11 to form the sidewall 53 and the bottom panels 29, 33 can slide past one another to form the bottom wall 55. In one embodiment, the sidewall 53 and the bottom wall 55 can extend along an interior 59 of the base layer 7. The liner 9 can be forced into the interior 59 into contact with the end panels 15, 17, the side panels 21, 25, the bottom panels 29, 33, and the central panel 11 (the flange 57) so that the liner 9 is at least partially adhered to the panels 15, 17, 21, 25, 29, 33, 11 and so that the liner 9 is combined with the base layer 7 to form the container 5.

Figure 5:
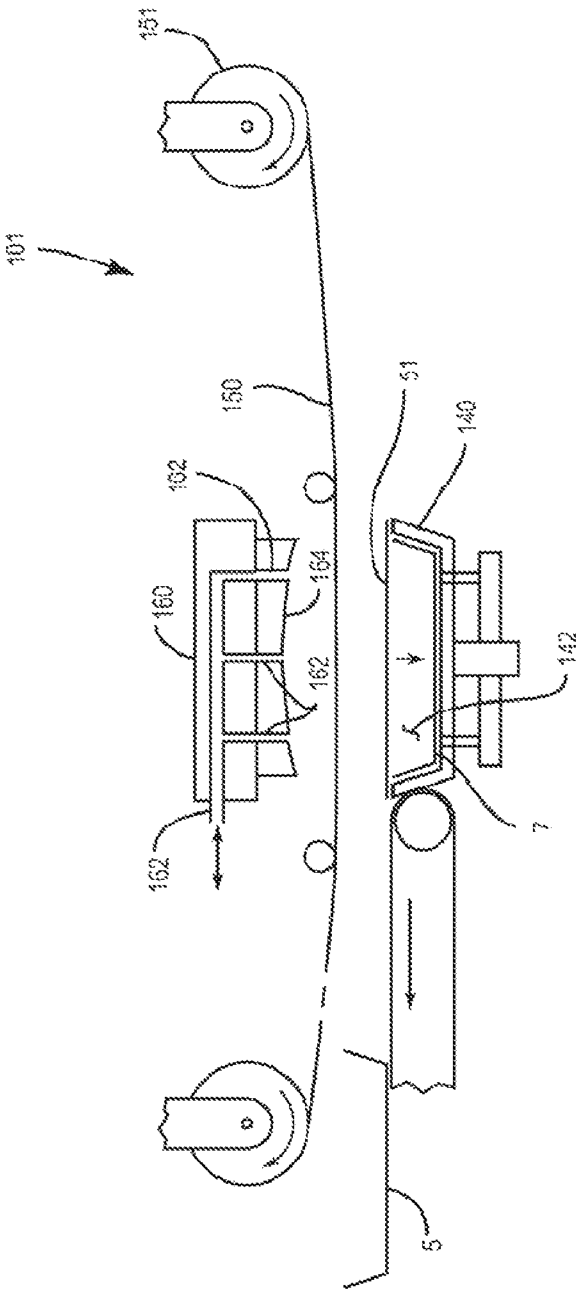
FIG. 5 is a schematic of an apparatus for forming a container in an exemplary embodiment of the disclosure.

In one embodiment, the container 5 can be formed similarly to the formation of the containers as shown and described in the incorporated-by-reference applications (e.g., the '425 application, the '814 Application, and/or the '131 application) except that the forming tool can be omitted and the flat construct 51 can be moved to a lower die without prior forming of the construct into the base layer 7. In an exemplary embodiment shown schematically in FIG. 5, the flat construct 51 can be placed on a lower die 140 of a system 101 and a liner material or film sheet 150 (e.g., a polyethylene or PET web) can be fed from a supply roller 151 above the construct 151. An upper die 160 has a heater plate surface 164 having a PTFE coating, for example a Teflon® coating. Alternatively, the heater plate surface 164 could have a coating of any suitable material or the coating could be omitted. As schematically shown in FIG. 5, the upper die 160 can include a plurality of holes or ducts 162 in the heater plate surface 164 for applying a vacuum and/or air pressure on the sheet 150. The lower die 140 and/or the upper die 160, including the ducts 162 and/or the heater plate 164, could be otherwise shaped, arranged, positioned, and/or configured without departing from the disclosure. For example, the heater plate 164 could be omitted and the heat could be alternatively applied to the sheet 150 (e.g., with a flow of hot air).

In the illustrated embodiment, the lower die 140 can hold the construct 51 over a cavity 142 in the lower die 140 while supporting the construct 51 at the central panel 11 and/or the attachment portions 37, 39 (e.g., so that the central panel 11 is facing upwardly as shown in FIG. 4). An initial vacuum can be applied to ducts 162 to draw the film sheet 150 toward the upper die 160, the upper die 160 can be heated to a suitable temperature to soften the film sheet 150 and/or to activate a heat seal layer. Instead of, or in addition to, the initial vacuum, air pressure under the film sheet 150 can be employed with similar or equal effect. Subsequently, the film sheet 150 can be forced downwardly (e.g., by air pressure applied by the ducts 162 and/or a vacuum applied from below the construct 51). The air pressure can move the film sheet toward the construct and can cause the construct to form the base layer 7 (e.g., the end panels 13, 17 and the side panels 21, 25 can fold downwardly from the central panel 11 to form the interior 59 as shown in FIG. 4). The lower die can support the base layer 7 as the liner is formed into the interior and adhered to the flange 57, the sidewall 53, and the bottom wall 55 of the base layer 7 to form the container 5 (FIG. 4). In one embodiment, the liner 9 can help retain the container 5 in its tray shape after the liner is applied to the base layer 7. In one embodiment, the container 5 can be ejected from the lower die 140 and transported away from the forming tool on a conveyor, for example.

In one embodiment, the container 5 can be formed from the construct 51 at a much higher rate than systems that first must form the base layer 7 from a blank and then place that formed base layer 7 into the lower die 140. In one example, systems that first form the base layer from the blank can form containers at a rate of approximately 60 trays per minute, while the container 5 of the present embodiment can be formed from the construct 51 without a prior forming step at a rate of approximately 200 trays per minute. The container 5 could be otherwise formed without departing from the disclosure. For example, the container 5 could be formed from the construct 51 prior to applying the liner 9 (e.g., prior to engaging the lower die 140).

In one embodiment, a lid (not shown) can comprise packaging film that is a thin plastic layer used to preserve and protect a food item contained in the tray and can be removably attached to the flange 57 of the container 5. Any plastic film, such as polyethylene, polypropylene, polyethylene terephthalate, polyvinylchloride, polyamide, and ethylene vinyl alcohol, or other suitable material, can be used for forming the lid that is sealed against the sealing surface of the flange 57. Further, adhesives can be used between the lid and the sealing surface of the flange 57 without departing from the disclosure. In one embodiment, the sealing surface of the flange 57 comprises an upper surface of the central panel 11, which is generally free from joints, creases, folds, pleats, edges, and other features that can make sealing a lidding film to the flange more difficult (e.g., that can reduce the smoothness of the flange). Accordingly, the upper surface of the central panel 11 in the container 5 of the illustrated embodiment can provide a superior sealing surface than a container that has features such as pleats or joints on its upper flange surface. In one embodiment, the arrangement of the end panels 13, 17, which are foldably connected along the cutout 45 of the central panel 11, and the side panels 21, 25, which are foldably connected along the outer edges of the central panel 11 and folded under the central panel, can allow the upper surface of the central panel 11 to be flat and/or smooth for forming the sealing surface. In one embodiment, the smooth upper surface of the central panel 11 also can facilitate better attachment between the base layer 7 and the liner 9 at the upper surface of the flange.

Figure 6:
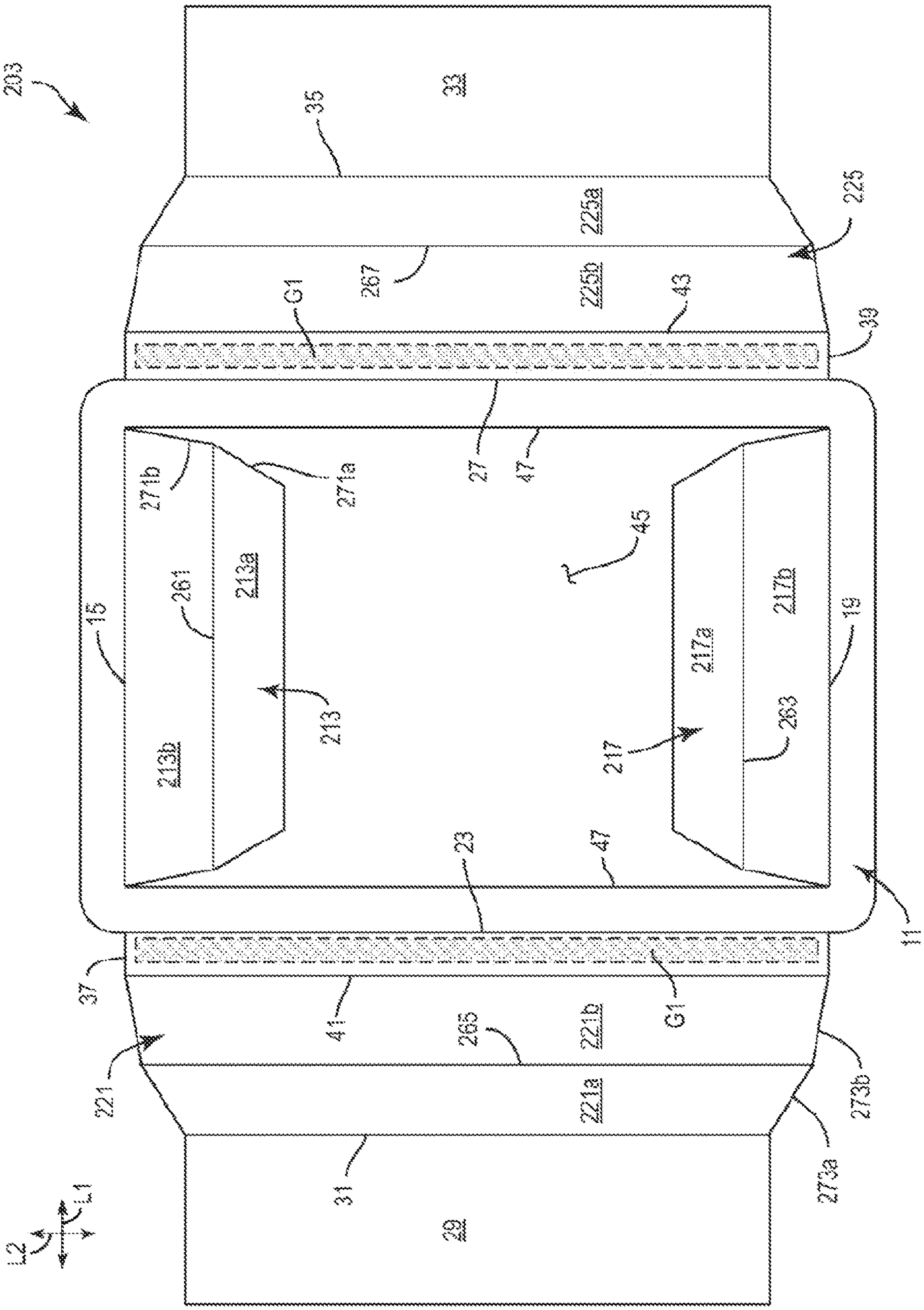
FIG. 6 is a plan view of a blank used for forming a container according to a second exemplary embodiment of the disclosure.

FIG. 6 is a plan view of a blank 203 for forming a base layer of a container (not shown) of a second embodiment of the disclosure. The second embodiment is generally similar to the first embodiment, except for variations noted and variations that will be apparent to one of ordinary skill in the art. Accordingly, similar or identical features of the embodiments have been given like or similar reference numbers. As shown in FIG. 6, the first end panel 213 includes a lower portion 213*a* foldably connected to an upper portion 213*b* along a longitudinal intermediate fold line 261, the second end panel 217 includes a lower portion 217*a* foldably connected to an upper portion 217*b* along a longitudinal intermediate fold line 263, the first side panel 221 includes a lower portion 221*a* foldably connected to an upper portion 221*b* along a lateral intermediate fold line 265, and the second side panel 225 includes a lower portion 225*a* foldably connected to an upper portion 225*b* along a lateral intermediate fold line 267. In the illustrated embodiment, the upper portions 213*b*, 217*b* of the respective end panels 213, 217 are foldably connected to the central panel 11 along the respective fold lines 15, 19. Similarly, the upper portions 221*b*, 225*b* of the respective side panels 221, 225 are foldably connected to the respective attachment portions 37, 39 along the respective fold lines 41, 43 and the attachment portions 37, 39 are foldably connected to the central panel 11 along respective fold lines 23, 27. In one embodiment, each of the lower portions 213*a*, 217*a* of the respective end panels 213, 217 has two lower oblique edges 271*a*, and each of the upper portions 213*b*, 217*b* of the respective end panels 213, 217 has two upper oblique edges 271*b*. Similarly, each of the lower portions 221*a*, 225*a* of the respective side panels 221, 225 has two lower oblique edges 273*a*, and each of the upper portions 221*b*, 225*b* of the respective side panels 221, 225 has two upper oblique edges 273*b*. The blank 3 could be otherwise shaped, arranged, and/or configured without departing from the disclosure. In addition, any of the central panel 11, the end panels 213, 217, the side panels 221, 225, and/or the bottom panels 29, 33 could be omitted or could be otherwise shaped, arranged, positioned, and/or configured without departing from the disclosure. For example, the blank 203 could have any suitable number of panels and any suitable shape.

In one embodiment, when the container (not shown) is formed from the blank 203, the end panels 213, 217 and the side panels 221, 225 can combine to form a sidewall (not shown) with a lower portion formed from the lower portions 213*a*, 217*a*, 221*a*, 225*a* foldably connected to an upper portion formed from the upper portions 213*b*, 217*b*, 221*b*, 225*b* along an intermediate fold line formed by the intermediate fold lines 261, 263, 265, 267. In an exemplary embodiment, the upper portions 213*b*, 217*b*, 221*b*, 225*b* of the panels 213, 217, 221, 225 can be oblique with respect to the respective lower portions 213*a*, 217*a*, 221*a*, 225*a* of the panels 213, 217, 221, 225 in the sidewall. Accordingly, the lower portion of the sidewall can extend obliquely from the bottom wall formed by the bottom panels 29, 33 at an obtuse angle and the upper portion of the sidewall can extend obliquely from the lower portion at an obtuse angle so that the liner 9 can more easily engage the surfaces of the sidewall and the bottom wall at the corners of the container. For example, the liner 9 (e.g., a PET liner) can more easily fit into obtuse corners than corners that are at or near 90 degrees. Accordingly, the container formed from the blank 203 of the second embodiment can be more suitable for certain liners (e.g., PET liners, which can be more suitable for use in a conventional oven) in some exemplary embodiments.

Figure 7:
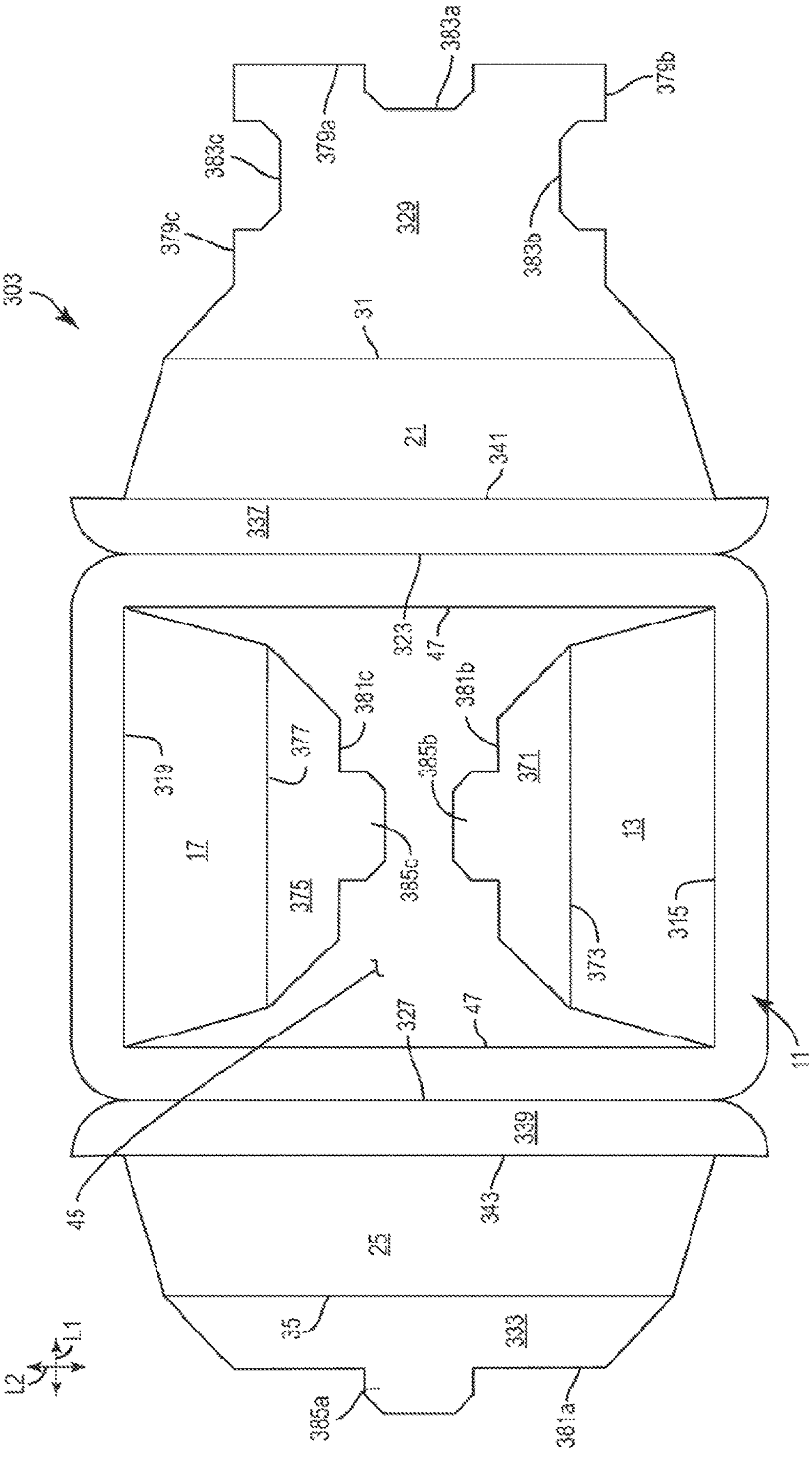
FIG. 7 is a plan view of a blank used for forming a container according to a third exemplary embodiment of the disclosure.

FIG. 7 is a plan view of a blank 303 for forming a base layer 307 of a container 305 (FIG. 10A) of a third embodiment of the disclosure. The third embodiment is generally similar to the prior embodiments, except for variations noted and variations that will be apparent to one of ordinary skill in the art. Accordingly, similar or identical features of the embodiments have been given like or similar reference numbers. As shown in FIG. 7, the blank 303 can include the first bottom panel 329 and the second bottom panel 333 foldably connected to the respective first side panel 21 and second side panel 25 along the respective lateral fold lines 31, 35, a third bottom panel 371 foldably connected to the first end panel 13 along a longitudinal fold line 373, and a fourth bottom panel 375 foldably connected to the second end panel 17 along a longitudinal fold line 377. As shown in FIG. 7, the third bottom panel 371 and the fourth bottom panel 375 can extend from the respective first end panel 13 and second end panel 17 in the opening 45. In the illustrated embodiment, the first bottom panel 329 can include a lateral edge 379*a* and longitudinal edges 379*b*, 379*c*. Similarly, the second bottom panel 333 can include a lateral edge 381*a* and the third bottom panel 371 and the fourth bottom panel 375 can include respective longitudinal edges 381*b*, 381*c*. In one embodiment, the bottom panels 329, 333, 371, 375 also can include oblique edges extending from the respective side panels 21, 25 and end panels 13, 17.

Figure 10B:
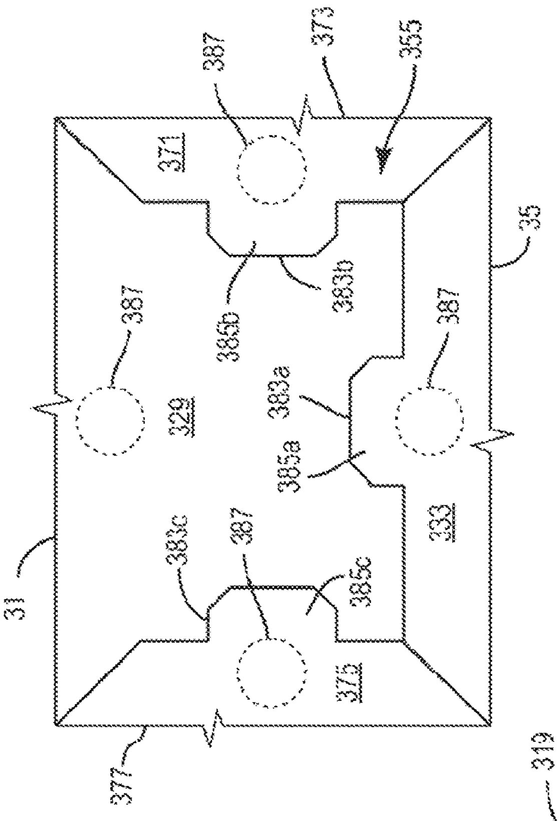
FIG. 10B is a schematic plan view of a bottom wall of the container of FIG. 10A.
Figure 10A:
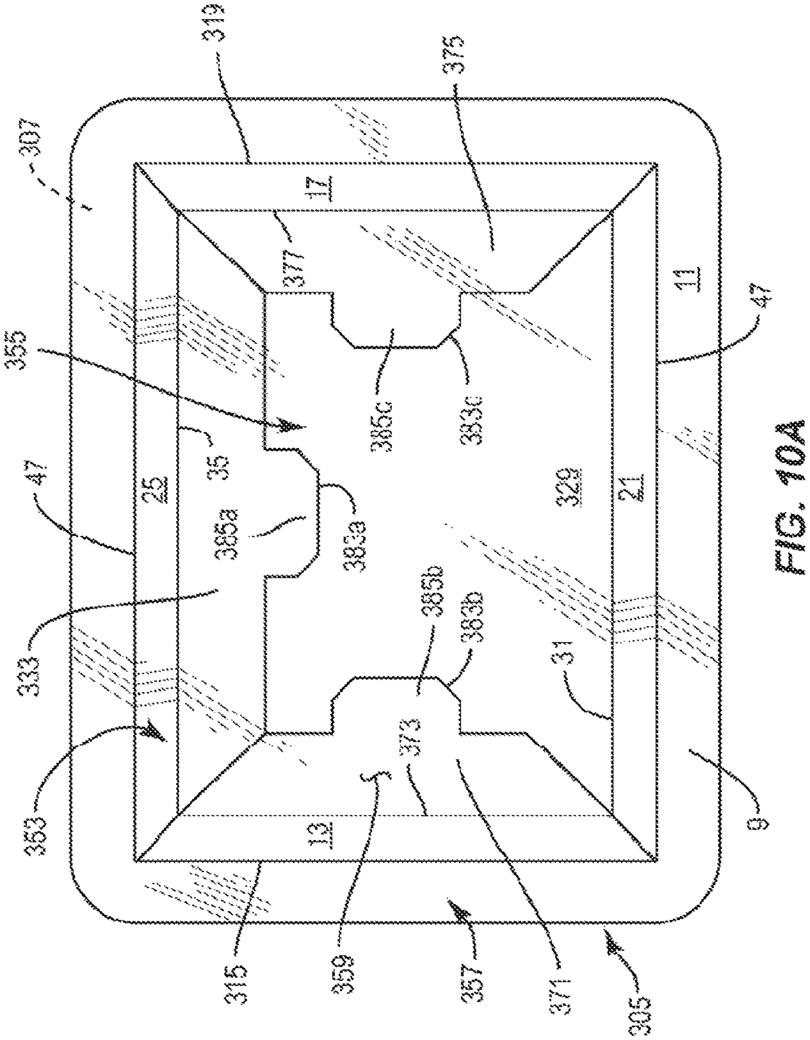
FIG. 10A is a top perspective view of the container formed from the construct of FIGS. 8 and 9 according to the third exemplary embodiment of the disclosure.

As shown in FIG. 7, three notches 383*a*, 383*b*, 383*c* can be defined in the first bottom panel 329 and can extend from the respective lateral edge 379*a* and longitudinal edges 379*b*, 379*c*. In addition, a tab 385*a* can extend from the lateral edge 381*a* of the second bottom panel 333 and tabs 385*b*, 385*c* can extend from the respective longitudinal edges 381*b*, 381*c* of the respective third bottom panel 371 and fourth bottom panel 375. In the illustrated embodiment, the tabs 385*a*, 385*b*, 385*c* are complementary with the respective notches 383*a*, 383*b*, 383*c* so that the tabs 385*a*, 385*b*, 385*c* fit in the respective notches 383*a*, 383*b*, 383*c* (e.g., as shown schematically in FIGS. 10A and 10B). For example, as shown in FIGS. 7, 10A, and 10B, each of the notches 383*a*, 383*b*, 383*c* and tabs 385*a*, 385*b*, 385*c* can have three orthogonal edges connected by two oblique edges. Alternatively, the notches 383*a*, 383*b*, 383*c* and the tabs 385*a*, 385*b*, 385*c* could have any suitable shape.

As shown in FIG. 7, the attachment portions 337, 339 of the respective side panels 21, 25 can extend beyond the edges of the side panels 21, 25 and can have curved edges that correspond to the respectively adjacent curved corner edges of the central panel 11 so that the curved edges of the attachment portions 337, 339 extend along or proximate the respectively adjacent curved corner edges of the central panel 11 when the construct 351 (FIGS. 8 and 9) is formed. The blank 303 could be otherwise shaped, arranged, positioned, and/or configured without departing from the disclosure.

Figure 8:
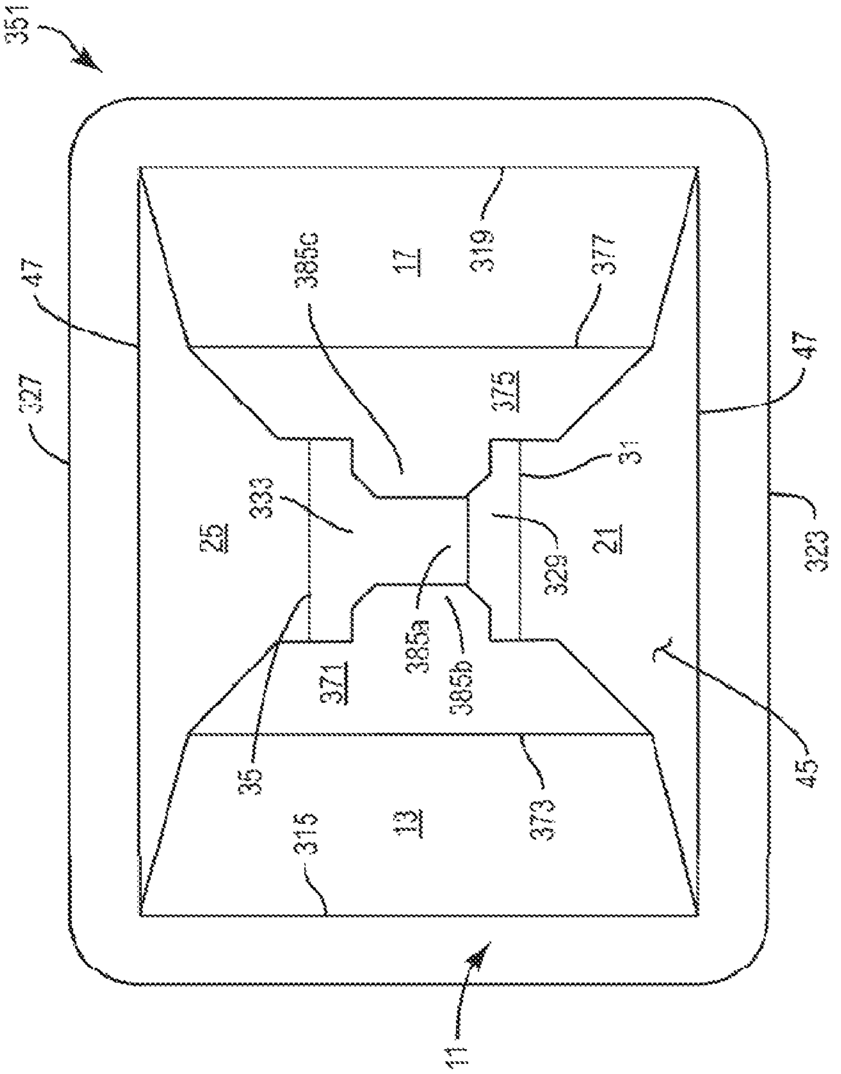
FIGS. 8 and 9 are plan views of a flat construct formed from the blank of FIG. 7 according to the third exemplary embodiment of the disclosure.
Figure 9:
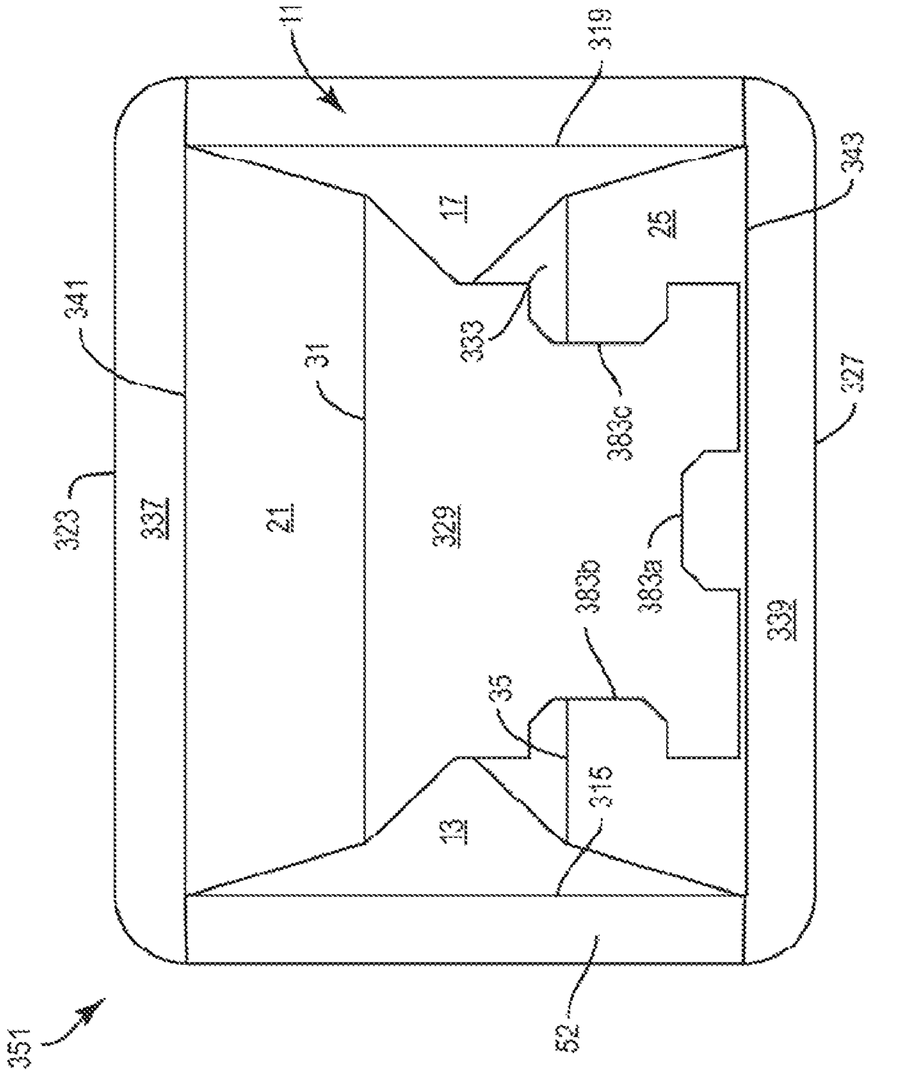

As shown in FIGS. 8 and 9, the blank 303 can be formed into a flat construct 351 (e.g., a folded and glued blank), which is prepared to be formed into the base portion 307 of the container 305 as described in more detail below. The construct 351 can be formed by applying adhesive (e.g., in the form of glue strips) to the attachment portions 337, 339 of the side panels 21, 25 and/or to the portions of the central panel 11 adjacent to the attachment portions 337, 339 and folding the side panels 21, 25 along the respective fold lines 323, 327 over the central panel 11. The attachment portions 337, 339 can be folded into face-to-face contact with the undersurface 52 of the central panel 11 so that the glue strips adhere the attachment portions 337, 339 to the central panel 11 (FIG. 9). As shown in FIGS. 8 and 9, the side panels 21, 25, the end panels 13, 17, and the bottom panels 329, 333, 371, 375 can at least partially overlap one another adjacent the cutout 45. The construct 351 could be otherwise formed without departing from the disclosure.

As shown in FIGS. 8 and 9, the construct 351 can lie substantially flat for compact storage and/or transportation while being prepared to form the container 305. In the illustrated embodiment, the container 305 can be formed from the flat construct 351 by folding the end panels 13, 17 downwardly relative to the central panel 11 along the respective fold lines 315, 319 and folding the side portions of the side panels 21, 25 downwardly relative to the central panel 11 and the attachment portions 337, 339 along the respective fold lines 341, 343. As shown in FIG. 10A, the end panels 13, 17 and the side portions of the side panels 21, 25 extend generally downwardly from the central panel 11 to at least partially form a sidewall 353 extending around a perimeter of a bottom wall 355 formed from the bottom panels 329, 333, 371, 375. As shown in FIGS. 10A and 10B, the bottom wall 355 can be formed by folding the bottom panels 329, 333, 371, 375 relative to the respective side panels 21, 25 and end panels 13, 17 along respective fold lines 31, 35, 373, 377 so that the bottom panels 333, 371, 375 are positioned adjacent the first bottom panel 329. In the illustrated embodiment, the tabs 385*a*, 385*b*, 385*c* can be received in the respective notches 383*a*, 383*b*, 383*c* in the first bottom panel 329 (e.g., so an edge of each tab is adjacent to, proximate to, or abutting the edge of the respective notches). In one embodiment, the bottom panels 329, 333, 371, 375 can be coplanar.

In the illustrated embodiment, the central panel 11 and the attachment portions 337, 339 can form a flange 357 of the container 305. In the illustrated embodiment, the upper surface of the central panel 11 forms the upper surface of the flange 357 so that the upper surface of the flange 357 lacks joints, pleats, folds, creases, edges, and/or other features that can reduce the smoothness of the flange. This can help the flange 357 to provide a better surface for attaching the liner 309 to the base 307 (FIG. 10A) and/or for attaching a lid film (not shown) to the flange 357. The liner 309 can be similar or identical to the liner 9 of the first embodiment. In one embodiment, a lid film or other cover for enclosing the interior 359 of the container 305 can form a tighter seal with the flange 357 than if the flange included pleats, joints, folds, creases, edges, and/or other features that can interfere with the formation of a seal between the cover and the flange. The sidewall 353, the bottom wall 355, and/or the flange 357 could be omitted or could be otherwise shaped, arranged, positioned, and/or configured without departing from the disclosure. Further, the flange 357 can comprise one piece of board (e.g., the central panel 11) that has a top surface that extends around the perimeter of the container. The attachment portions 337, 339 glued to the central panel 11 strengthen the flange 357 and strengthen and increase rigidity of the container 305. In alternative embodiments, the attachment portions 337, 339 could be omitted without departing from the disclosure.

Figure 11A:
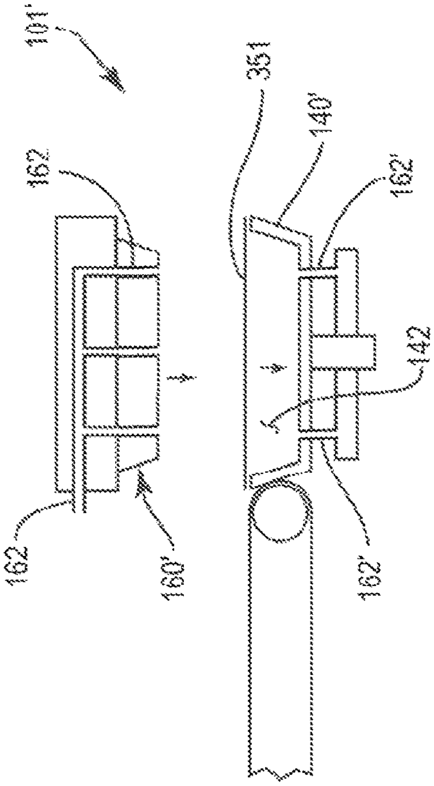
FIGS. 11A and 11B are schematic views of an apparatus for forming a container in an exemplary embodiment of the disclosure.
Figure 11B:
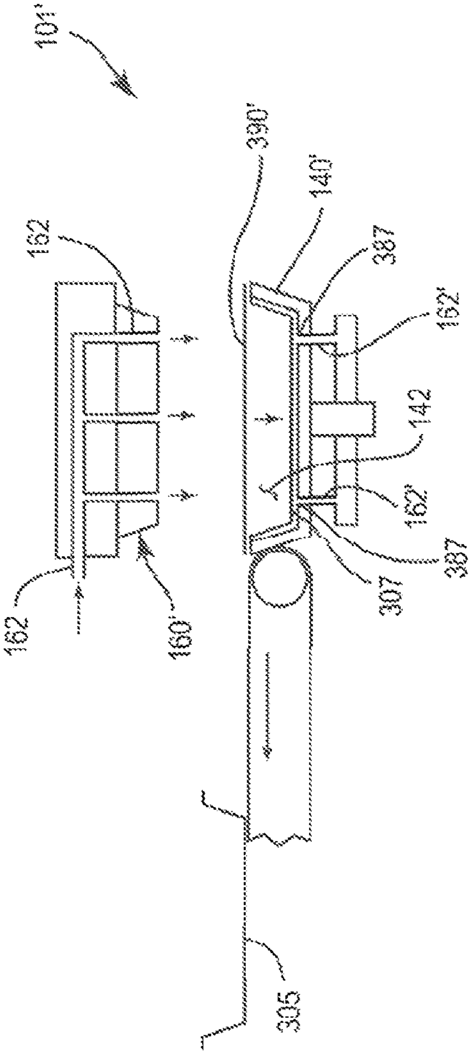

As shown schematically in FIGS. 11A and 11B, the container 305 can be formed by placing the construct 351 on a lower die 140' of a forming tool or system 101'(FIG. 11A) in an upright orientation (e.g., as shown in FIG. 8) so that the central panel 11 and the attachment portions 337, 339 of the side panels 21, 25 rest on an upper surface of the lower die 140' and the end panels 13, 17, the side portions of the side panels 21, 25, and the bottom panels 329, 333, 371, 375 extend over a cavity 142 in the lower die. A plunger 160' of the forming tool 101' can move downwardly onto the construct 351 and can press the end panels 13, 17, the side portions of the side panels 21, 25, and the bottom panels 329, 333, 371, 375 downwardly while moving through the opening 45 of the construct 351. As the plunger continues to move downwardly into the cavity of the lower die, the plunger can press the side portions of the end panels 13, 17 and the side panels 21, 25 against the sidewall of the cavity and can press the bottom panels 329, 333, 371, 375 against a bottom wall of the cavity to form the sidewall 353 and the bottom wall 355 of the base 307 (e.g., FIGS. 10A and 10B).

In one embodiment, vacuum pressure can be applied to one or more of the bottom panels 329, 333, 371, 375, the end panels 13, 17, and the side panels 21, 25 to help fold the panels into position and/or to help hold the panels in position in the cavity of the lower die. For example, vacuum pressure can be applied via vacuum ducts 162' extending through the lower die 140' to the bottom panels at vacuum locations 387 shown schematically in FIG. 10B. In one embodiment, the vacuum pressure at the vacuum locations 387 can help retain the bottom panels 329, 333, 371, 375 against the bottom wall of the lower die with the tabs 385*a*, 385*b*, 385*c* engaged with the respective notches 383*a*, 383*b*, 383*c* until the liner 309 is applied to the base 307 as described in more detail below. Once the sidewall 353 and the bottom wall 355 are formed and the vacuum pressure is applied to the bottom wall 355 (e.g., at vacuum locations 387) and/or the sidewall 353, the plunger can retract from the lower die.

Subsequently, as shown in FIG. 11B, a liner sheet 309' (e.g., liner material for forming the liner 309) can be moved over the lower die and prepared for being attached to the base 307 (e.g., laminated, adhered, heat sealed, and/or otherwise attached to the base). In one embodiment, the liner sheet 309' can be formed and sized to be applied to the base with zero or nearly zero waste material. The liner sheet 309' can be heated (e.g., by heating the plunger 160' or another suitable apparatus and/or by applying hot air to the sheet via the ducts 162 in the plunger 160'). In an exemplary embodiment, heating the liner sheet 309' can facilitate heat sealing and/or forming the liner sheet and/or activating a heat-activated adhesive or heat seal layer on the liner sheet 309'. In one embodiment, the heated liner sheet 309' can be pressed onto the flange 357 and into the cavity 142 onto the sidewall 353 and the bottom wall 355 (e.g., by air pressure applied above the liner sheet 309' via the ducts 162 as shown in FIG. 11B and/or by vacuum pressure applied below the liner sheet 309' and the base layer 307 via the vacuum ducts 162'). Alternatively, an upper die such as the plunger 160' that formed the base 307, can be moved downwardly to press the liner sheet 309' against the flange 357 and into the cavity 142 against the sidewall 353 and the bottom wall 355. In one embodiment, the plunger 160' can heat the liner sheet 309' as the plunger presses the liner sheet against the base layer 307.

In the illustrated embodiment, the liner sheet 309' can come into contact with the base 307 (e.g., the liner sheet can be pressed against the base) so that an adhesive layer, heat seal layer, and/or any other suitable attachment means can attach the liner sheet 309' to the base layer 307 to form the liner 309 (FIG. 10A). Alternatively or in addition, heating the liner sheet 309' can soften and/or melt the liner sheet so that the liner sheet at least partially fuses to the base layer 307 as they are pressed together. With the base 307 and the liner 309 attached, the vacuum pressure and/or any other air pressure can be stopped and/or an upper die can be removed from the lower die and the container 305 can be ejected from the forming tool. Subsequently another construct 351 can be moved onto the lower die, and the process can be repeated. The container 305 could be otherwise formed without departing from the disclosure. For example, an adhesive can be applied to the liner sheet 309' and the plunger 160' can press the liner sheet 309' against the base layer 307 to form the liner 309 without heating the liner sheet 309'.

In one embodiment, the liner 309 can be attached to the upper surface of the flange 357 (e.g., the upper surface of the central panel 11), to each of the end panels 13, 17 and side panels 21, 25 of the sidewall 353, and to each of the bottom panels 329, 333, 371, 375 of the bottom wall 355. In one embodiment, the liner 309 can at least partially retain the base 307 in the shape of the sidewall 353 and the bottom wall 355. For example, the liner 309 can help maintain the bottom panels 329, 333, 371, 375 in a coplanar relationship with the tabs 385*a*, 385*b*, 385*c* engaging the respective notches 383*a*, 383*b*, 383*c* (e.g., the notches receiving the tabs). In one embodiment, the engagement of the tabs with the notches can help strengthen the bottom wall 355 and the container 305 in general. The container 305, including the liner 309 and/or the base layer 307, could be otherwise shaped, arranged, positioned, and/or configured without departing from the disclosure. The container 305 having a flange 357, bottom wall 355, and sidewall 353 is formed from the blank 303 that is one piece of board. In some embodiments, the container 305 can be a generally four-sided container having four sidewalls 353 that extend downwardly from the flange 357 to the bottom wall 355. The container 305 could be shapes other than four-sided without departing from the disclosure.

Figure 12:
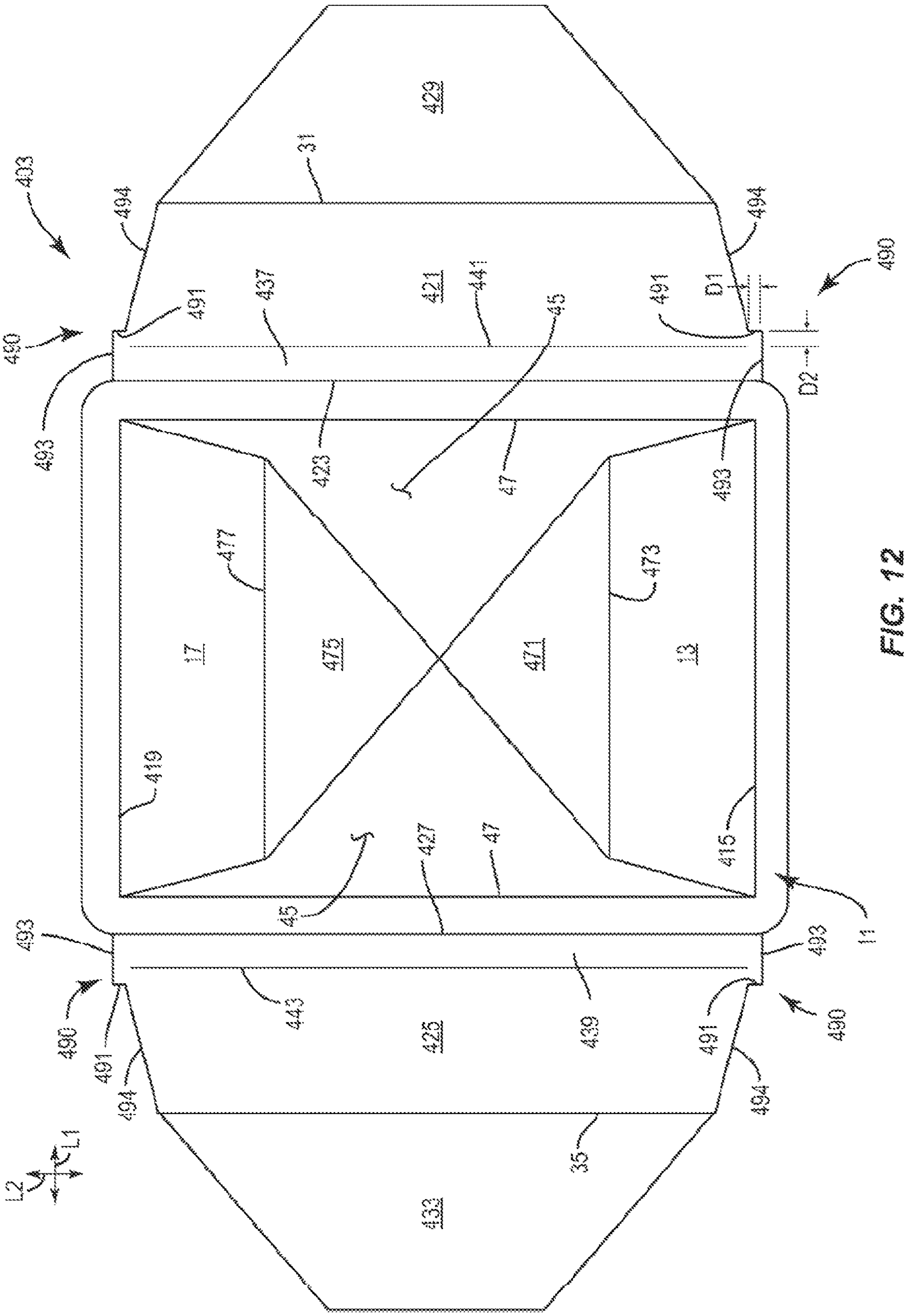
FIG. 12 is a plan view of a blank used for forming a container according to a fourth exemplary embodiment of the disclosure.

FIG. 12 is a plan view of a blank 403 for forming a base layer 407 of a container 405 (FIGS. 14-17) of a fourth embodiment of the disclosure. The fourth embodiment is generally similar to the prior embodiments, except for variations noted and variations that will be apparent to one of ordinary skill in the art. Accordingly, similar or identical features of the embodiments have been given like or similar reference numbers. As shown in FIG. 12, the first end panel 13 and the second end panel 17 are foldably connected to the central panel 11 along respective fold lines 415, 419, and the blank 403 can include a first side panel 421 and a second side panel 425 foldably connected to the central panel 11 along respective fold lines 423, 427. In the illustrated embodiment, a first bottom panel 429 and a second bottom panel 433 are foldably connected to the respective first side panel 421 and second side panel 425 along respective lateral fold lines 31, 35, a third bottom panel 471 is foldably connected to the first end panel 13 along a longitudinal fold line 473, and a fourth bottom panel 475 is foldably connected to the second end panel 17 along a longitudinal fold line 477. As shown in FIG. 12, the third bottom panel 471 and the fourth bottom panel 475 can extend from the respective first end panel 13 and second end panel 17 in the opening 45 and can have oblique edges that converge on respective points of the bottom panels 471, 475, wherein the points of the bottom panels can abut one another in the opening 45. Alternatively, the bottom panels 471, 475 could be otherwise shaped and/or could be spaced from one another. In the illustrated embodiment, the first bottom panel 429 and the second bottom panel 433 can have oblique edges that extend to respective ends of respective lateral edges. As shown in FIG. 12, the side panels 421, 425 include respective attachment portions 437, 439 at least partially defined by respective fold lines 441, 443 and respective fold lines 423, 427.

Figure 14:
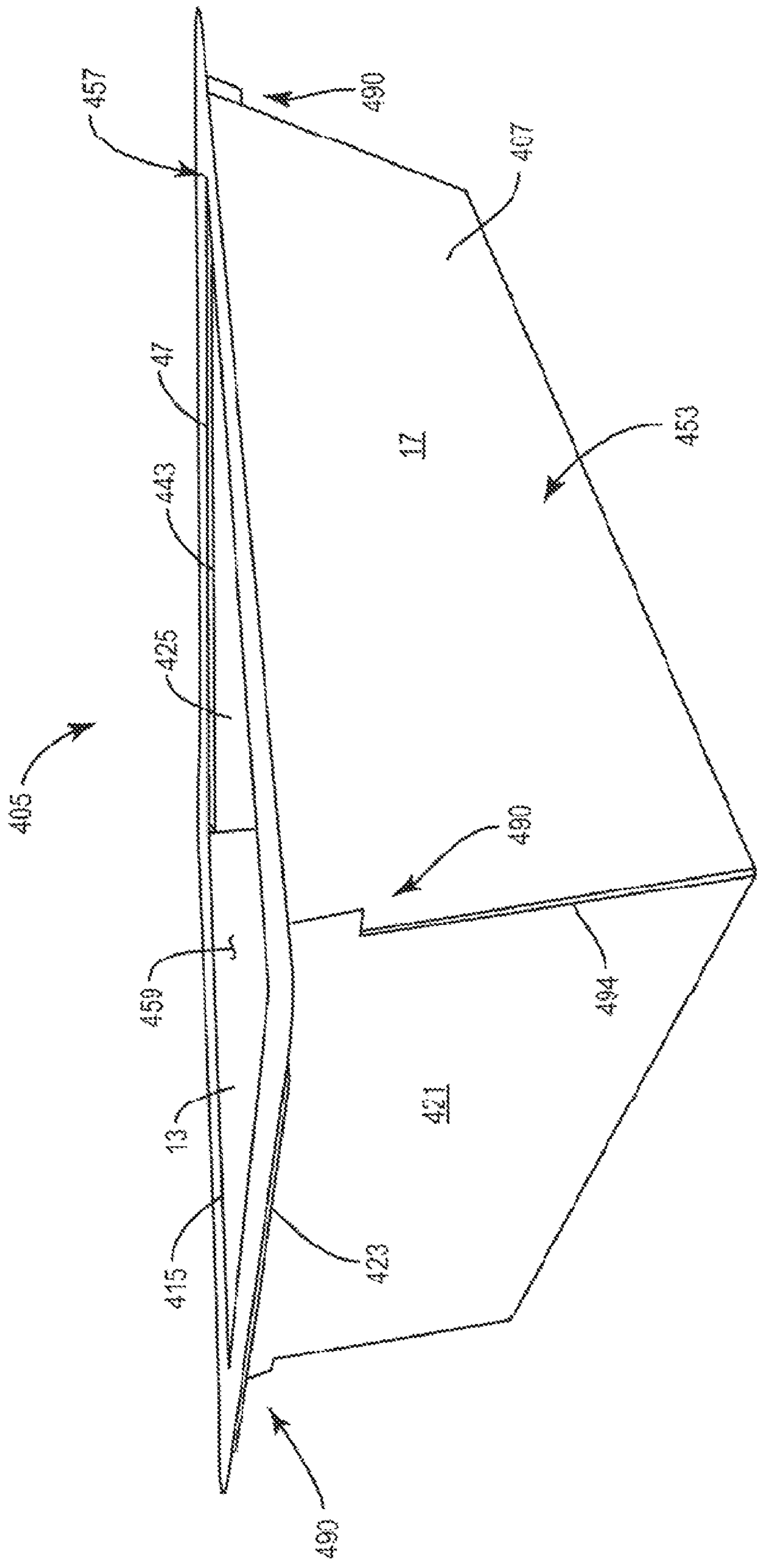
FIG. 14 is perspective a view of the container formed from the construct of FIG. 13 according to the fourth exemplary embodiment of the disclosure.
Figure 15:
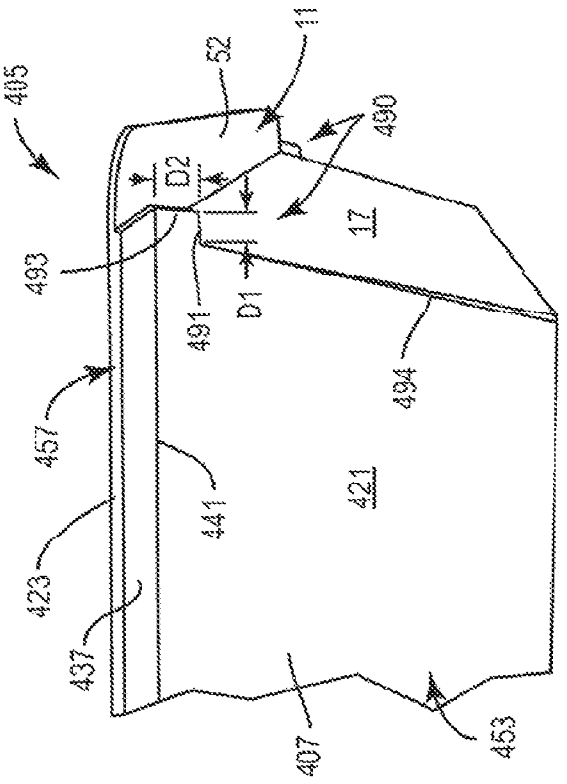
FIG. 15 is a detail view of a corner portion of the container of FIG. 14.
Figure 16:
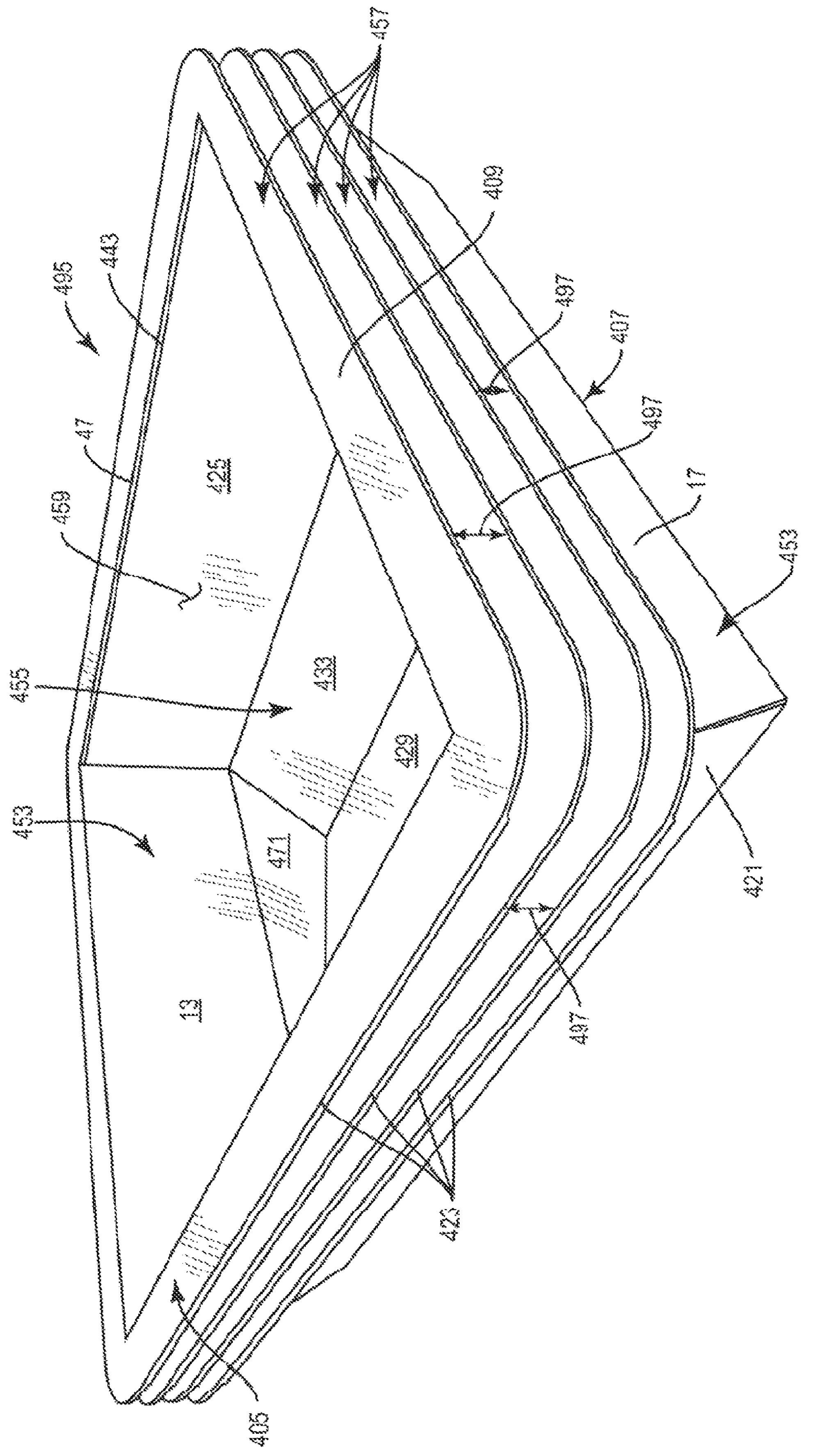
FIGS. 16 and 17 are perspective views of a stacked arrangement of the containers of FIGS. 14 and 15 according to the fourth exemplary embodiment of the disclosure.
Figure 17:
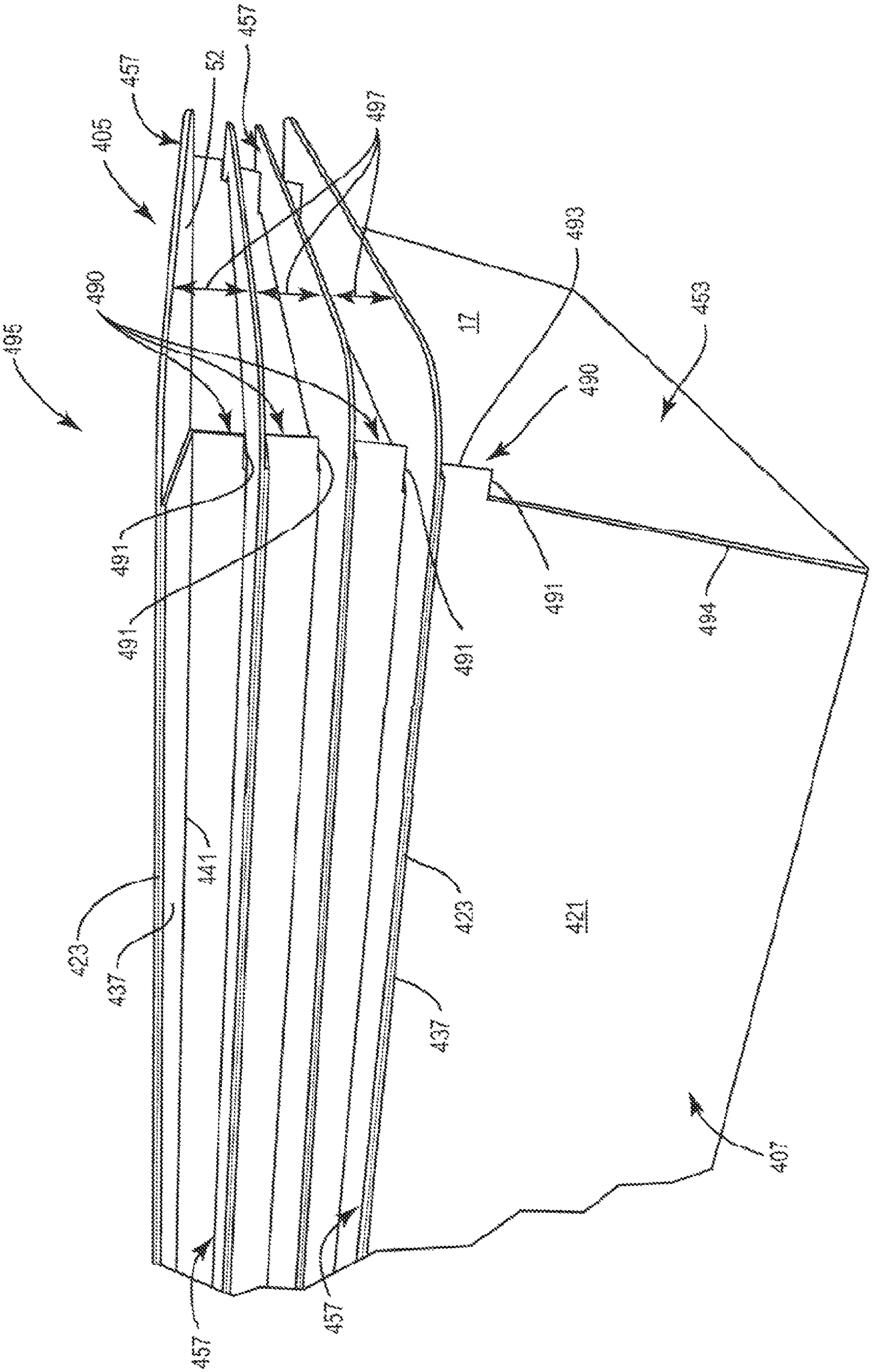

As shown in FIG. 12, the blank 403 can include denesting features including spacers or shoulders 490 extending from the ends of the side panels 421, 425 adjacent the respective attachment portions 437, 439. In the illustrated embodiment, each shoulder 490 can include a lateral edge 491 extending from the respective side panel 421, 425 and a longitudinal edge 493 extending from the lateral edge 491 to the central panel 11. As shown in FIG. 12, each of the shoulders 490 extends from a side edge 494 of a side portion of the respective side panels 421, 425. In one embodiment, each of the lateral edges 491 can form a flange engagement edge with a length D1 (FIGS. 12 and 15), which can correspond to the distance that each of the lateral edges 491 extends outwardly from the sidewall 453 of the container 405 (FIGS. 14, 15, and 17) for engaging a flange 457 of another container 405 (e.g., a nested container) when the containers are arranged in a stack (FIGS. 16 and 17). As shown in FIG. 12, each of the longitudinal edges 493 can extend a distance D2 from the lateral edge 491 to the respective fold line 441, 443, and the distance D2 can correspond to the spacing between the lateral edges 491 and the flange 457 of the container 405 (FIGS. 14, 15, and 17). The denesting features, including the shoulders 490, could be otherwise shaped, arranged, positioned, and/or configured without departing from the disclosure.

Figure 13:
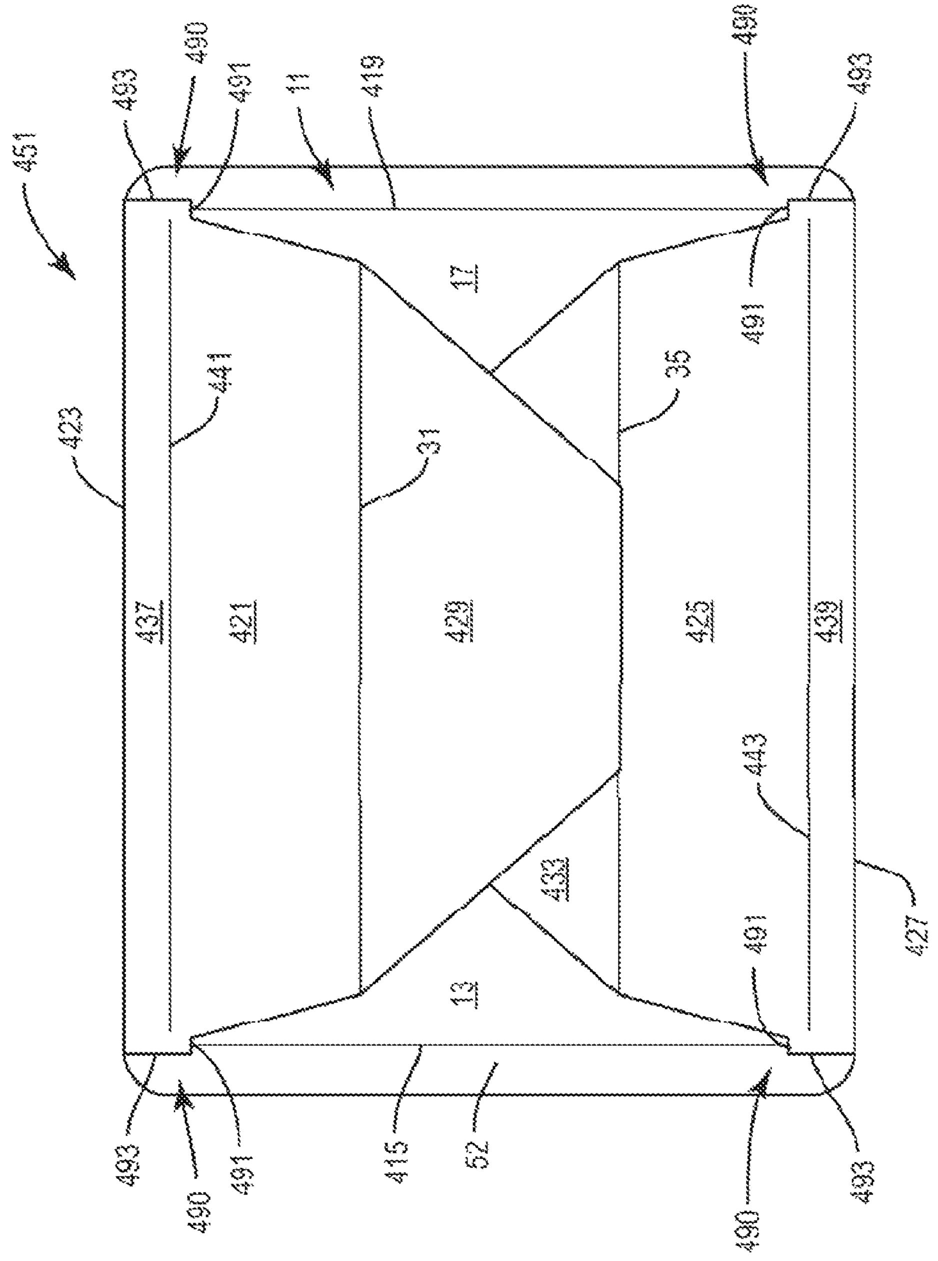
FIG. 13 is a plan view of a flat construct formed from the blank of FIG. 12 according to the fourth exemplary embodiment of the disclosure.

As shown in FIGS. 13 and 14, the blank 403 can be formed into a flat construct 451 (e.g., a folded and glued blank), which is prepared to be formed into the base portion 407 of the container 405. The construct 451 can be formed by applying adhesive (e.g., in the form of glue strips) to the attachment portions 437, 439 of the side panels 421, 425 and/or to the portions of the central panel 11 adjacent to the attachment portions 437, 439 and folding the side panels 421, 425 along the respective fold lines 423, 427 over the central panel 11. The attachment portions 437, 439 can be folded into face-to-face contact with an undersurface 52 of the central panel 11 so that the glue strips adhere the attachment portions 437, 439 to the central panel 11. As shown in FIGS. 13 and 14, the side panels 421, 425, the end panels 13, 17, and the bottom panels 429, 433, 471, 475 can at least partially overlap one another adjacent the cutout 45. The construct 451 could be otherwise formed without departing from the disclosure.

As shown in FIGS. 13 and 14, the construct 351 can lie flat (e.g., approximately or substantially flat) for compact storage and/or transportation while being prepared to form the container 405. In the illustrated embodiment, the container 405 can be formed from the flat construct 451 by folding the end panels 13, 17 downwardly relative to the central panel 11 along the respective fold lines 415, 419 and folding the side portions of the side panels 421, 425 downwardly relative to the central panel 11 and the attachment portions 437, 439 along the respective fold lines 441, 443. As shown in FIGS. 14 and 15, the end panels 13, 17 and the side panels 421, 425 extend generally downwardly from the central panel 11 to at least partially form a sidewall 453 extending around a perimeter of a bottom wall 455 (FIG. 16) formed from the at least partially overlapped bottom panels 429, 433, 471, 475. In one embodiment, the end panels 13, 17 and the side panels 421, 425 can extend obliquely (e.g., upwardly and outwardly) from the bottom wall 455.

As shown in FIGS. 14-17, the central panel 11 and the attachment portions 437, 439 can form the flange 457 of the container 405. In the illustrated embodiment, the upper surface of the central panel 11 forms the upper surface of the flange 457 so that the upper surface of the flange 457 lacks joints, pleats, folds, creases, edges, and/or other features that can reduce the smoothness of the flange. This can help the flange 457 to provide a better surface for attaching a liner 409 (FIG. 16) to the base 407 and/or for attaching a lid film (not shown) to the flange 457. In one embodiment, a lid film or other cover for enclosing the interior 459 of the container 405 can form a tighter seal with the flange 457 than if the flange included pleats, joints, folds, creases, edges, and/or other features that can interfere with the formation of a seal between the cover and the flange. The sidewall 453, the bottom wall 455, and/or the flange 457 could be omitted or could be otherwise shaped, arranged, positioned, and/or configured without departing from the disclosure. Further, the flange 457 can comprise one piece of board (e.g., the central panel 11) that has a top surface that extends around the perimeter of the container. The attachment portions 437, 439 glued to the central panel 11 strengthen the flange 457 and strengthen and increase rigidity of the container 405. In one embodiment, the base 407 can be formed and the liner can be applied to the base 407 to form the container 405 in a similar or identical manner as any of the containers 5, 305 of the prior embodiments. The container 405 could be alternatively formed without departing from the disclosure.

As shown in FIGS. 16 and 17, the container 405 can be arranged with other containers 405 in a nested or stacked arrangement 495, wherein the sidewall 453 and the bottom wall 455 of each container 405 is positioned at least partially in the interior 459 of a lower, nested container 405. As shown in FIGS. 14, 15, and 17, the shoulders 490 can extend downwardly from the flange 457 of each container 405 (e.g., from the respective fold line 441, 443) to form the denesting features. In the illustrated embodiment, the shoulders 490 extend outwardly from each of the corners of the sidewall 453 of the container 405 the distance D1 and extend downwardly from the flange 457 of the container 405 the distance D2. Accordingly, when the end panels 13, 17 of an upper container 405 are positioned adjacent the interior surfaces of the respective end panels 13, 17 of a lower nested container 405, the lateral edges 491 of the shoulders 490 extend outwardly from the sidewall 453 of the upper container 405 over the flange 457 of the lower container 405. In the illustrated embodiment, the shoulders 490 can support the upper container 405 at the lateral edges 491 relative to the lower container 405 (e.g., the lateral edges 491 of the upper container can engage the upper surface of the central panel 11 of the lower container) and can prevent the upper container 405 from moving farther into the interior 459 of the lower nested container 405. As shown in FIGS. 16 and 17, the shoulders 490 can form denesting gaps 497 between the flanges 457 of adjacent containers 405 in the stacked arrangement 495. In one embodiment, the height of each gap 497 can be equal to (e.g., approximately or substantially equal to) the distance D2 between the lateral edge 491 of each shoulder 490 and the respective fold line 441, 443. The stacked arrangement 495 and/or any of the shoulders 490 could be otherwise shaped, arranged, positioned, and/or configured without departing from the disclosure.

In one embodiment, the denesting gaps 497 formed by the shoulders 490 in the stacked arrangement can facilitate separation of the containers 405 from the stacked arrangement 495 (e.g., denesting the containers 405). For example, if the shoulders 490 were omitted, the containers 405 could move farther into the interior 459 of the respectively lower containers 405 so that the flanges 457 of adjacent containers 405 can be positioned adjacent one another (e.g., the adjacent flanges 457 could be spaced by a small distance or in contact or engagement with one another). Without the denesting gap 497 formed by the shoulders 490, it can be more difficult to grasp the flanges 457 of the stacked containers 405 and pull the containers apart and/or it can be more difficult for a denesting apparatus (not shown) to move between two flanges 457 for separating the containers 405. In the illustrated embodiment, the denesting gap 497 can allow a user to more easily grasp the flange 457 of one of the containers 405 (e.g., the topmost container) and to pull the container 405 off the stacked arrangement 495 by its flange 457. Alternatively or in addition, the denesting gap 497 can provide space for a denesting device (not shown) to move between the flanges 457 of two adjacent containers 405 in the stacked arrangement 495 so that the denesting device may push the containers 405 apart at their flanges 457.

Any of the features of the various embodiments of the disclosure can be combined with, replaced by, or otherwise configured with other features of other embodiments of the disclosure without departing from the scope of this disclosure.

Optionally, one or more portions of the blank or other constructs described herein or contemplated hereby may be coated with varnish, clay, or other materials, either alone or in combination. The coating may then be printed over with product advertising or other information or images. The blanks or other constructs also may be selectively coated and/or printed so that less than the entire surface area of the blank or substantially the entire surface area of the blank may be coated and/or printed.

Any of the blanks, containers, or other constructs of this disclosure may optionally include one or more features that alter the effect of microwave energy during the heating or cooking of a food item that is associated with the tray or other construct. For example, the blank, tray, container, or other construct may be formed at least partially from one or more microwave energy interactive elements (hereinafter sometimes referred to as "microwave interactive elements") that promote heating, browning and/or crisping of a particular area of the food item, shield a particular area of the food item from microwave energy to prevent overcooking thereof, or transmit microwave energy towards or away from a particular area of the food item. Each microwave interactive element comprises one or more microwave energy interactive materials or segments arranged in a particular configuration to absorb microwave energy, transmit microwave energy, reflect microwave energy, or direct microwave energy, as needed or desired for a particular construct and food item.

In the case of a susceptor or shield, the microwave energy interactive material may comprise an electroconductive or semiconductive material, for example, a vacuum deposited metal or metal alloy, or a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide, for example, oxides of aluminum, iron, and tin, optionally used in conjunction with an electrically conductive material. Another metal oxide that may be suitable is indium tin oxide (ITO). ITO has a more uniform crystal structure and, therefore, is clear at most coating thicknesses.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

In other embodiments, the microwave energy interactive material may be carbon-based, for example, as disclosed in U.S. Pat. Nos. 4,943,456, 5,002,826, 5,118,747, and 5,410,135.

In still other embodiments, the microwave energy interactive material may interact with the magnetic portion of the electromagnetic energy in the microwave oven. Correctly chosen materials of this type can self-limit based on the loss of interaction when the Curie temperature of the material is reached. An example of such an interactive coating is described in U.S. Pat. No. 4,283,427.

The use of other microwave energy interactive elements is also contemplated. In one example, the microwave energy interactive element may comprise a foil or high optical density evaporated material having a thickness sufficient to reflect a substantial portion of impinging microwave energy. Such elements typically are formed from a conductive, reflective metal or metal alloy, for example, aluminum, copper, or stainless steel, in the form of a solid "patch" generally having a thickness of from about 0.000285 inches to about 0.005 inches, for example, from about 0.0003 inches to about 0.003 inches. Other such elements may have a thickness of from about 0.00035 inches to about 0.002 inches, for example, 0.0016 inches.

In some cases, microwave energy reflecting (or reflective) elements may be used as shielding elements where the food item is prone to scorching or drying out during heating. In other cases, smaller microwave energy reflecting elements may be used to diffuse or lessen the intensity of microwave energy. One example of a material utilizing such microwave energy reflecting elements is commercially available from Graphic Packaging International, Inc. (Atlanta, Ga.) under the trade name MicroRite® packaging material. In other examples, a plurality of microwave energy reflecting elements may be arranged to form a microwave energy distributing element to direct microwave energy to specific areas of the food item. If desired, the loops may be of a length that causes microwave energy to resonate, thereby enhancing the distribution effect. Microwave energy distributing elements are described in U.S. Pat. Nos. 6,204,492, 6,433,322, 6,552,315, and 6,677,563, each of which is incorporated by reference in its entirety.

If desired, any of the numerous microwave energy interactive elements described herein or contemplated hereby may be substantially continuous, that is, without substantial breaks or interruptions, or may be discontinuous, for example, by including one or more breaks or apertures that transmit microwave energy. The breaks or apertures may extend through the entire structure, or only through one or more layers. The number, shape, size, and positioning of such breaks or apertures may vary for a particular application depending on the type of construct being formed, the food item to be heated therein or thereon, the desired degree of heating, browning, and/or crisping, whether direct exposure to microwave energy is needed or desired to attain uniform heating of the food item, the need for regulating the change in temperature of the food item through direct heating, and whether and to what extent there is a need for venting.

By way of illustration, a microwave energy interactive element may include one or more transparent areas to effect dielectric heating of the food item. However, where the microwave energy interactive element comprises a susceptor, such apertures decrease the total microwave energy interactive area, and therefore, decrease the amount of microwave energy interactive material available for heating, browning, and/or crisping the surface of the food item. Thus, the relative amounts of microwave energy interactive areas and microwave energy transparent areas may be balanced to attain the desired overall heating characteristics for the particular food item.

As another example, one or more portions of a susceptor may be designed to be microwave energy inactive to ensure that the microwave energy is focused efficiently on the areas to be heated, browned, and/or crisped, rather than being lost to portions of the food item not intended to be browned and/or crisped or to the heating environment. Additionally or alternatively, it may be beneficial to create one or more discontinuities or inactive regions to prevent overheating or charring of the food item and/or the construct including the susceptor.

As still another example, a susceptor may incorporate one or more "fuse" elements that limit the propagation of cracks in the susceptor, and thereby control overheating, in areas of the susceptor where heat transfer to the food is low and the susceptor might tend to become too hot. The size and shape of the fuses may be varied as needed. Examples of susceptors including such fuses are provided, for example, in U.S. Pat. Nos. 5,412,187, 5,530,231, U.S. Patent Application Publication No. US 2008/0035634A1, published Feb. 14, 2008, and PCT Application Publication No. WO 2007/127371, published Nov. 8, 2007, each of which is incorporated by reference herein in its entirety.

All dimensional information presented herein is intended to be illustrative of certain aspects, features, etc., of various embodiments of the disclosure, and is not intended to limit the scope of the disclosure. The dimensions of the blanks, containers, forming tools, features, or any other dimension, can be more or less than what is shown and described in this disclosure without departing from the scope of this disclosure and can be within the listed ranges of dimensions for each feature or outside the listed ranges of dimensions for each feature without departing from the scope of this disclosure.

The blanks according to the present invention can be, for example, formed from coated paperboard and similar materials. For example, the interior and/or exterior sides of the blanks can be coated with a clay coating. The clay coating may then be printed over with product, advertising, price coding, and other information or images. The blanks may then be coated with a varnish to protect any information printed on the blanks. The blanks may also be coated with, for example, a moisture barrier layer, on either or both sides of the blanks.

In accordance with the exemplary embodiments, the blanks may be constructed of paperboard of a caliper such that it is heavier and more rigid than ordinary paper. The blanks can also be constructed of other materials, such as cardboard, hard paper, or any other material having properties suitable for enabling the carton package to function at least generally as described above.

The foregoing description illustrates and describes various embodiments of the present disclosure. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, and alterations, etc., of the above-described embodiments. Additionally, the disclosure shows and describes only selected embodiments, but various other combinations, modifications, and environments are contemplated and are within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments without departing from the scope of the disclosure.

What is claimed is:

1. A method of forming a container for holding a food product, the method comprising:

obtaining a flat construct, the flat construct comprises central panel, an opening extending in the central panel, a first panel foldably connected to the central panel along a first fold line extending along the opening, a second panel foldably connected to the central panel along a second fold line that is spaced apart from the opening, a first bottom panel foldably connected to the first panel, and a second bottom panel foldably connected to the second panel;

applying air pressure to a heated liner material and the construct to move the liner material toward the construct, the applying air pressure causing the construct to form a base layer having an interior, the applying air pressure causes the first panel and the second panel to fold downwardly relative to the central panel to at least partially form a sidewall of the base layer, and the applying air pressure comprises forming a bottom wall from the first bottom panel and the second bottom panel; and moving the liner material into the interior of the base layer to adhere the liner material to the base layer.

2. The method of claim 1, wherein the central panel comprises an edge extending from an end of the first fold line and along the opening, the edge being perpendicular to the first fold line.

3. The method of claim 1, wherein the second panel comprises an attachment portion, and the method comprises positioning the central panel and the attachment portion in an overlapping relationship.

4. The method of claim 3, wherein the central panel comprises an edge extending along the opening, the attachment portion of the second panel extends from the second fold line to the edge of the central panel, and the method comprises positioning a portion of the second panel to extend downwardly from the attachment portion and the edge of the central panel.

5. The method of claim 3, wherein the attachment portion of the second panel is at least partially defined by a third fold line extending in the second panel.

6. The method of claim 3, wherein the attachment portion is positioned at least partially in face-to-face contact with an undersurface of the central panel.

7. The method of claim 1, wherein the first bottom panel comprises a tab extending from a first edge of the first bottom panel, the second bottom panel comprises a notch in a second edge of the second bottom panel, and the forming the bottom wall comprises at least partially engaging the tab and the notch.

8. The method of claim 1, wherein each of the first panel and the second panel comprises a respective lower portion foldably connected to a respective upper portion along a respective intermediate fold line.

9. The method of claim 1, wherein the construct further comprises a third panel foldably connected to the central panel along a third fold line extending along the opening and a fourth panel foldably connected to the central panel along a fourth fold line that is spaced apart from the opening, the applying air pressure positions the third panel opposite to the first panel and the fourth panel opposite to the second panel to at least partially form the sidewall of the base layer.

10. The method of claim 9, wherein the second panel comprises a first attachment portion, the fourth panel comprises a second attachment portion, the method comprises positioning the central panel to at least partially overlap each of the first attachment portion and the second attachment portion, and positioning a portion of each of the second panel and the fourth panel to extend at least downwardly from the respective first attachment portion and second attachment portion.

11. The method of claim 10, wherein the construct comprises a third bottom panel foldably connected to the fourth panel, the forming the bottom wall comprises at least partially overlapping the third bottom panel and the second bottom panel.

12. The method of claim 11, the adhering the liner to the base layer comprises at least partially attaching the liner to each of the central panel, the first panel, the second panel, the third panel, the fourth panel, the first bottom panel, the second bottom panel, and the third bottom panel.

13. The method of claim 9, wherein the construct comprises a third bottom panel foldably connected to the third panel and a fourth bottom panel foldably connected to the fourth panel, wherein the fourth bottom panel comprises at least a first notch, a second notch, and a third notch in respective edges of the fourth bottom panel, the first bottom panel comprises a first tab, the second bottom panel comprises a second tab, and the third bottom panel comprises a third tab, the forming the bottom wall comprises at least partially engaging the first tab and the first notch, at least partially engaging the second tab with the second notch, and at least partially engaging the third tab with the third notch.

14. The method of claim 13, the adhering the liner to the base layer comprises comprising at least partially attaching the liner to each of the central panel, the first panel, the second panel, the third panel, the fourth panel, the first bottom panel, the second bottom panel, the third bottom panel, the fourth bottom panel, the first tab, the second tab, and the third tab.

15. The method of claim 9, wherein each of the first panel, the second panel, the third panel, and the fourth panel comprises a respective lower portion foldably connected to a respective upper portion along a respective intermediate fold line.

16. The method of claim 1, wherein the adhering the liner to the base layer comprises at least partially attaching the liner to each of the central panel, the sidewall, and the bottom wall.

17. The method of claim 1, wherein the construct comprises a third panel foldably connected to the central panel along a third fold line extending along the opening.

18. The method of claim 17, wherein the central panel comprises a first edge and a second edge, each of the first edge and the second edge extending from a respective end of the first fold line to a respective end of the third fold line.

* * * * *